United States Patent
Chung et al.

(10) Patent No.: US 9,462,590 B2
(45) Date of Patent: *Oct. 4, 2016

(54) METHOD OF DATA TRANSMISSION IN MULTIPLE ANTENNA SYSTEM

(71) Applicant: LG Electronics Inc., Seoul (KR)

(72) Inventors: Jae Hoon Chung, Anyang-si (KR); Hyun Soo Ko, Anyang-si (KR); Seung Hee Han, Anyang-si (KR); Moon Il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 56 days.

This patent is subject to a terminal disclaimer.

(21) Appl. No.: 14/619,887

(22) Filed: Feb. 11, 2015

(65) Prior Publication Data

US 2015/0173057 A1  Jun. 18, 2015

Related U.S. Application Data

(63) Continuation of application No. 14/076,966, filed on Nov. 11, 2013, now Pat. No. 8,982,981, which is a continuation of application No. 13/899,125, filed on May 21, 2013, now Pat. No. 8,675,767, which is a (Continued)

(30) Foreign Application Priority Data

Mar. 2, 2009  (KR) .................. 10-2009-0017741

(51) Int. Cl.
*H04W 72/04*  (2009.01)
*H04L 25/03*  (2006.01)

(Continued)

(52) U.S. Cl.
CPC .......... *H04W 72/046* (2013.01); *H04B 7/0413* (2013.01); *H04L 1/06* (2013.01); *H04L 1/0625* (2013.01); *H04L 1/0631* (2013.01);

(Continued)

(58) Field of Classification Search
None
See application file for complete search history.

(56) References Cited

U.S. PATENT DOCUMENTS

| | | | | |
|---|---|---|---|---|
| 7,961,810 B2* | 6/2011 | Varadarajan | ......... | H04B 7/0417 375/219 |
| 8,064,394 B2* | 11/2011 | Jongren | ............... | H04B 7/0617 370/329 |
| 2008/0186212 A1* | 8/2008 | Clerckx | ............... | H04B 7/0413 341/55 |

FOREIGN PATENT DOCUMENTS

| | | |
|---|---|---|
| CN | 1871807 A | 11/2006 |
| CN | 101611586 A | 12/2009 |

(Continued)

OTHER PUBLICATIONS

R1-080263: 3GPP TSG RAN WG1 #51bis Sevilla, Spain Jan. 14-18, 2008, LG Electronics "Efficient support of retransmission using codeword DTX and signaling".

(Continued)

*Primary Examiner* — Ian N Moore
*Assistant Examiner* — Brian T Le
(74) *Attorney, Agent, or Firm* — Dentons US LLP

(57) ABSTRACT

A method of data transmission includes determining the number of layers, generating mapping symbols by mapping modulation symbols for a first codeword and modulation symbols for a second codeword to each layer, and transmitting the mapping symbols through a plurality of antennas. At least one of the first codeword and the second codeword is mapped to at least 3 layers and the number of layers is larger than 3.

5 Claims, 21 Drawing Sheets

Related U.S. Application Data continuation of application No. 12/921,023, filed as application No. PCT/KR2009/001106 on Mar. 5, 2009, now Pat. No. 8,472,546.

(60) Provisional application No. 61/034,145, filed on Mar. 5, 2008.

(51) Int. Cl.
  *H04L 1/06* (2006.01)
  *H04L 1/18* (2006.01)
  *H04B 7/04* (2006.01)
  *H04L 5/00* (2006.01)
  *H04L 1/00* (2006.01)

(52) U.S. Cl.
  CPC ........... *H04L1/1893* (2013.01); *H04L 5/0026* (2013.01); *H04L 25/03343* (2013.01); *H04L 25/03929* (2013.01); *H04L 1/0041* (2013.01); *H04L 2025/03426* (2013.01)

(56) References Cited

FOREIGN PATENT DOCUMENTS

| | | |
|---|---|---|
| JP | 2010-521078 | 6/2010 |
| KR | 2001-76252 A | 8/2001 |
| KR | 2005-0053787 A | 6/2005 |
| KR | 2007-89748 A | 8/2007 |
| WO | 2006130541 A2 | 12/2006 |
| WO | 2008100213 | 8/2008 |

OTHER PUBLICATIONS

R1-070727: 3GPP TSG RAN WG1 48 St. Louis, Feb. 12-16, 2007, Texas Instruments "Codeword to Layer Mapping for E-Utra Mimo".
"3rd Generation Partnership Project; Technical Specification Group Radio Access Network; Evolved Universal Terrestrial Radio Access (E-UTRA); Physical Channels and Modulation", 3GPP TS 36.211, V8.1.0, Nov. 2007.
Samsung: "Considerations on codewords to layers mapping for downlink MIMO", R1-070130, 3GPP TSG RAN WG1 Meeting #47bis, Sorrento, Italy, Jan. 10, 2007.
LG Electronics: "Codeword to layer mapping for SU-MIMO", R1-070235, 3GPP TSG RAN WG1 , Meeting #47bis, Sorrento, Italy, Jan. 10, 2007.
Texas Instruments: "Codeword-to-Layer Mapping for E-ULTRA MIMO", R1-071199, 3GPP TSG RAN WG1 , Meeting #48, Sorrento, Italy, Feb. 18, 2007.
Ericsson: "Extending Codeword to Layer Mapping for Efficient Support of retransmissions", R1-080877, 3GPP TSG RAN WG1 , Meeting #52, Sorrento, Italy, Feb. 6, 2008.
Texas Instruments, "Codeword-to-layer mapping for E-UTRA MIMO", 3GPP TSG RAN WG1 48, St. Louis, USA, Feb. 12-16, 2007, R1-071199.
LG Electronics, "Issues on higher order MIMO", 3GPP TSG RAN WG1 Meeting #55bis, Ljubljana, Slovenia, Jan. 12-17, 2009, R1-090219.
Texas Instruments, "Supporting 8Tx Downlink SU-MIMO for Advanced E-UTRA", 3GPP TSG RAN WG1 #55bis, Ljubljana, Slovenia, Jan. 12-16, 2009, R1-090289.
Ericsson, "Extending Codeword to Layer Mapping for Efficient Support of Retransmissions", 3GPP TSG RAN WG1 #52, Sorrento, Italy, Feb. 11-15, 2008, R1-080877.
Texas Instruments, "Codeword-to-layer mapping for E-UTRA MIMO", 3GPP TSG RAN WG1 48, St. Louis, USA, Feb. 12-16, 2007, R1-070727.
LG Electronics, "Efficient support of retransmission using codeword DTX and signaling", 3GPP TSG RAN WG1 #51bis, Sevilla, Spain, Jan. 14-18, 2008, R1-080263.
3GPP TS 36.211 v8.1.0 (Nov. 2007), Technical Specification, "3rd Generation Partnership Project; Technical Specification Group Radio Access Network; Evolved Universal Terrestrial Radio Access (E-UTRA); Physical Channels and Modulation (Release 8)".
Texas Instruments: "Codeword-to-Layer Mapping for E-UTRA MIMO", 3GPP TSG RAN WG1 48, R1-070727, Feb. 12-16, 2007.
LG Electronics: "Efficient support of retransmission using codeword DTX and signaling", 3GPP TSG RAN WG1 #51bis, R1-080263, Jan. 14-18, 2008.
Samsung: "A Response to R1-070727 on the Discussion of 1+3 vs. 2+2 codeword to layer mapping", 3GPP TSG RAN WG1 Meeting #48, R1-071191, Feb. 12-16, 2007.
Ericsson: "Extending Codeword to Layer Mapping for Efficient Support of Retransmissions", 3GPP TSG RAN WG1 #52, R1-080877, Feb. 11-15, 2008.

\* cited by examiner

METHOD OF DATA TRANSMISSION IN MULTIPLE ANTENNA SYSTEM

This application is a continuation of, and claims priority to, U.S. patent application Ser. No. 14/076,966 filed Nov. 11, 2013, which is a continuation of U.S. patent application Ser. No. 13/899,125 filed May 21, 2013 (now issued as U.S. Pat. No. 8,675,767), which is a continuation of U.S. patent application Ser. No. 12/921,023 filed Sep. 30, 2010 (now issued as U.S. Pat. No. 8,472,546), which is a National Stage Entry of International Application No. PCT/KR2009/001106 filed Mar. 5, 2009, and claims the benefit of U.S. Provisional Application No. 61/034,145 filed Mar. 5, 2008 and Korean Application No. 10-2009-0017741 filed Mar. 2, 2009, all of which are hereby incorporated by reference in their entirety herein.

TECHNICAL FIELD

The present invention relates to a multiple antenna system, and more particularly, to a method of transmitting a codeword by mapping the codeword to a layer in the multiple antenna system.

BACKGROUND ART

Wireless communication systems are widely spread all over the world to provide various types of communication services such as voice or data. In general, the wireless communication system is a multiple access system capable of supporting communication with multiple users by sharing available system resources (e.g., bandwidth, transmit (Tx) power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

The OFDMA is a multiple access scheme for allocating subcarriers having orthogonality to respective users. The OFDMA can reduce inter-symbol interference (ISI) and provide a high data rate by supporting characteristics robust to frequency selective fading of a channel. By allocating mutually independent subcarriers to the users, the OFDMA significantly decreases a probability that a specific subcarrier is in a deep fading state with respect to all users. Therefore, since subcarriers have a mutually independent characteristic between users, Tx power decrease and throughput improvement can be achieved by adaptively allocating the subcarriers to a user having a good channel condition.

To overcome performance deterioration caused by channel fading of wireless communication, many researches have been conducted on spatial diversity and/or spatial multiplexing using a multiple input multiple output (MIMO) system. The MIMO system is implemented so that a transmitter and a receiver have two or more antennas, thereby providing advantages such as a high data rate, reliability improvement, channel capacity increase, etc.

Multiple antennas are supported in Institute of electrical and electronics engineers (IEEE) 802.16 (WiMAX) and 3rd generation partnership project (3GPP) long term evolution (LTE) for which standardization has recently been conducted. As disclosed in 3GPP TS 36.211 V8.0.0 (2007 September) "Technical Specification Group Radio Access Network; Evolved Universal Terrestrial Radio Access (E-UTRA); Physical channels and modulation (Release 8)", the 3GPP LTE employs the OFDMA in downlink and employs the SC-FDMA in uplink.

According to the 3GPP TS 36.211 V8.0.0, the 3GPP LTE supports up to 4 antenna ports. However, the number of antenna ports is expected to be greater than that in a next generation wireless communication system requiring a higher maximum data rate. Therefore, there is a need for a method of supporting 4 or more antenna ports in a multiple antenna system.

DISCLOSURE OF INVENTION

Technical Problem

The present invention provides a method of transmitting a codeword in a multiple antenna system.

Technical Solution

In an aspect, a method of data transmission in a multiple antenna system includes determining the number of layers, generating mapping symbols by mapping modulation symbols for a first codeword and modulation symbols for a second codeword to each layer, and transmitting the mapping symbols through a plurality of antennas. At least one of the first codeword and the second codeword is mapped to at least 3 layers and the number of layers is larger than 3.

The number of the plurality of antennas may be larger than 3 and the number of layers may be smaller than or equal to the number of the plurality of antennas.

The maximum number of layers may be 6 or 8.

The modulation symbols for each codeword may cyclically be mapped to each layer.

The method may further include retransmitting the first codeword or the second codeword. The retransmitting may include determining the new number of layers used for retransmission, generating new mapping symbols by mapping modulation symbols for a codeword to be transmitted to each layer, and transmitting the new mapping symbols through the plurality of antennas. The new number of layers may be smaller than the number of layers.

The method may further include changing the number of layers into the new number of layers, generating new mapping symbols by mapping the modulation symbols for the first codeword or the mapping modulation symbols for the second codeword to each layer, and transmitting the new mapping symbols through the plurality of antennas. The new number of layers may be smaller than the number of layers.

In another aspect, a transmitter includes a first mapper to generate modulation symbols for a first codeword, a second mapper to generate modulation symbols for a second codeword, a layer mapping unit to generate mapping symbols by mapping modulation symbols for a first codeword and modulation symbols for a second codeword to each layer, wherein at least one of the first codeword and the second codeword is mapped to at least 3 layers and the number of layers is larger than 3, and a precoder to process the mapping symbols based on a multiple-input multiple-output (MIMO) scheme.

In still another aspect, a communication method in a multiple antenna system includes establishing basic mapping, determining the use of extended mapping, and instructing the use of extended mapping. The number of layers used in the basic mapping is greater than the number of layers used in the extended mapping.

In still another aspect, a method of communication in a multiple antenna system is provided. The method includes acquiring the number of layers, receiving mapping symbols which are mapped to each layer, demapping the mapping symbols to generate modulation symbols for a first codeword or modulation symbols for a second codeword, wherein at least one of the first codeword and the second codeword is mapped to at least 3 layers and the number of layers is larger than 3.

Advantageous Effects

A multiple antenna system having 6 or 8 antenna ports can be implemented, and an improved data rate and quality of service (QoS) can be supported.

MODE FOR THE INVENTION

The technique, method and apparatus described below can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The wireless access technologies can be implemented with various wireless communication standard systems. 3rd generation partnership project (3GPP) long term evolution (LTE) is a part of an evolved-universal mobile telecommunications system (E-UMTS). The 3GPP LTE employs the OFDMA in downlink and employs the SC-FDMA in uplink. LTE-advance (LTE-A) is an evolution of the LTE.

For clarity, the following description will focus on the 3GPP LTE/LTE-A. However, technical features of the present invention are not limited thereto.

The term "or" is intended to mean an inclusive "or" rather than an exclusive "or". Unless specified otherwise, or clear from the context, a phrase "X employs A or B" is intended to mean any of the natural inclusive permutations. That is, the phrase "X employs A or B" is satisfied by any of the following instances: X employs A; X employs B; or X employs A and B. In addition, the articles "a" and "an" as used in this application and the appended claims is generally construed to mean "one or more" unless specified otherwise or clear from the context to be directed to a singular form.

The technique, method and apparatus described below applies to a multiple antenna system or a multiple input multiple output (MIMO) system using multiple transmit (Tx) antennas and at least one receive (Rx) antenna. The technology described below may apply to various MIMO schemes. The MIMO scheme includes spatial diversity in which the same stream is transmitted to multiple layers and spatial multiplexing in which multiple streams are transmitted to multiple layers. When the multiple streams are transmitted to a single user in the spatial multiplexing, it is called single user-MIMO (SU-MIMO) or spatial division multiple access (SDMA). When the multiple streams are transmitted to multiple users in the spatial multiplexing, it is called multi user-MIMO (MU-MTMO). According to whether feedback information reported from each user is used or not, the spatial diversity and the spatial multiplexing can be classified into an open-loop scheme and a closed-loop scheme.

Figure 1:
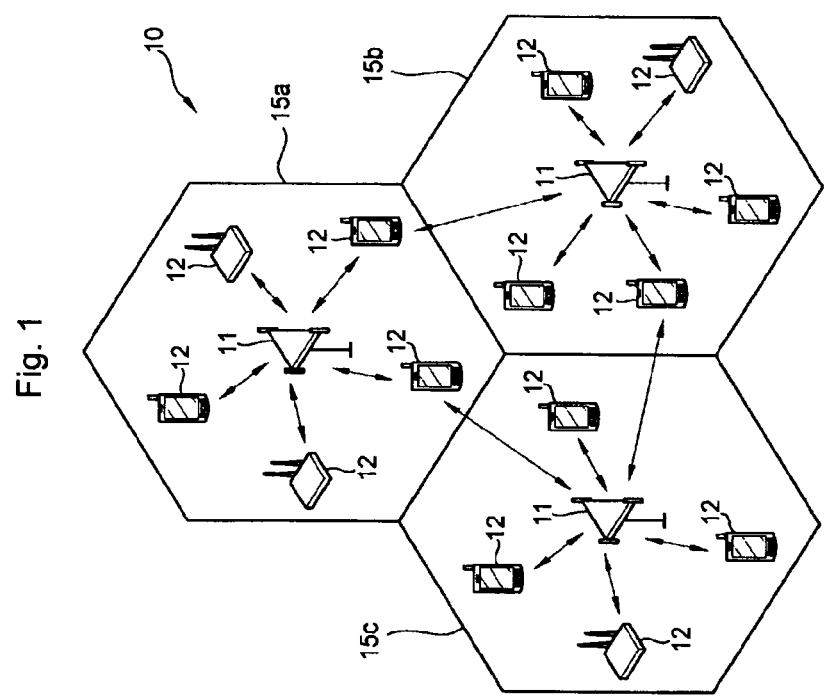
FIG. 1 shows a wireless communication system.

FIG. 1 shows a wireless communication system. Referring to FIG. 1, a wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink denotes a communication link from the BS to the UE, and an uplink denotes a communication link from the UE to the BS. In downlink, a transmitter may be a part of the BS, and a receiver may be a part of the UE. In uplink, the transmitter may be a part of the UE, and the receiver may be a part of the BS.

Figure 2:
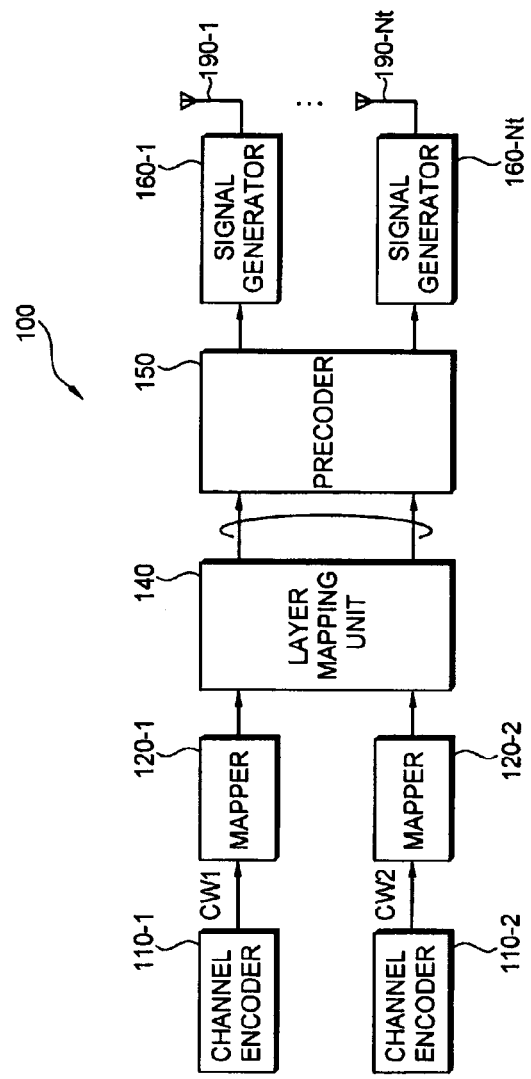
FIG. 2 is a block diagram showing a transmitter having multiple antennas according to an embodiment of the present invention.

FIG. 2 is a block diagram showing a transmitter having multiple antennas according to an embodiment of the present invention.

Referring to FIG. 2, a transmitter 100 includes channel encoders 110-1 and 110-2, mappers 120-1 and 120-2, a layer mapping unit 140, a precoder 150, and signal generators 160-1, . . . , 160-Nt. Nt denotes the number of antenna ports. The channel encoders 110-1 and 110-2 encode input information bits according to a predetermined coding scheme to generate codewords. The first channel encoder 110-1 generates a first codeword CW1, and the second channel encoder 110-2 generates a second codeword CW2.

The mappers 120-1 and 120-2 modulate the respective codewords according to a modulation scheme and then map the modulated codewords to modulation symbols having a demodulation value. There is no restriction on the modulation scheme. The modulation scheme may be m-phase shift keying (m-PSK) or m-quadrature amplitude modulation (m-QAM). For example, the m-PSK may be binary-PSK (BPSK), quadrature-PSK (QPSK), or 8-PSK. The m-QAM may be 16-QAM, 64-QAM, or 256-QAM. The first mapper 120-1 generates modulation symbols for the first codeword CW1. The second mapper 120-2 generates modulation symbols for the second codeword CW2.

Although the transmitter 100 includes the two channel encoders 110-1 and 110-2 and the two mappers 120-1 and 120-2 to process the two codewords, the number of channel encoders and the number of mappers included in the transmitter 100 are not limited thereto. The transmitter 100 may include at least one channel encoder and at least one mapper to process at least one codeword.

The layer mapping unit 140 maps modulation symbols of the input codewords CW1 and CW2 to each layer according to the number of layers. The layer may be an information path input to the precoder 150. The layer corresponds to a rank value. The layer mapping unit 140 may determine the number of layers (i.e., rank), and thereafter map modulation symbols of each codeword.

The precoder 150 processes a mapping symbol which is mapped to each layer by using a MIMO scheme depending on a plurality of antenna ports 190-1, . . . , 190-Nt and outputs antenna specific symbols. The signal generators 160-1, . . . , 160-Nt convert the antenna specific symbols into Tx signals. The Tx signals are transmitted through the respective antenna ports 190-1, . . . , 190-Nt. The signal generators 160-1, . . . , 160-Nt may perform orthogonal frequency division multiplexing (OFDM) modulation or may generate a transmit signal by using an SC-FDMA modulation scheme or other schemes well-known to those skilled in the art.

The transmitter 100 can support hybrid automatic repeat request (HARQ). In a retransmission process for the HARQ, the same layer mapping as initial transmission may be performed, or layer mapping for retransmission may be performed. Further, the transmitter 100 can support rank adaptation in which a rank is changed according to a channel condition.

According to the section 6.3 of 3GPP TS 36.211 V8.0.0 (2007 September), in the 3GPP LTE, modulation symbols $d^{(q)}(0), \ldots d^{(q)}(M^{(q)}_{symb}-1)$ for a codeword q are mapped to a layer $x(i)=[x^{(0)}(i) \ldots x^{(v-1)}(i)]^T$ ($i=0, 1, \ldots, M^{layer}_{symb}-1$). Herein, $M^{(q)}_{symb}$ denotes the number of modulation symbols for the codeword q, u denotes the number of layers, and $M^{layer}_{symb}$ denotes the number of modulation symbols for each layer. Table 1 shows codeword-to-layer mapping for spatial multiplexing.

Table 1

TABLE 1

| Number of layers | Number of code words | Codeword-to-layer mapping $i = 0, 1, \ldots, M^{layer}_{symb} - 1$ | |
|---|---|---|---|
| 1 | 1 | $x^{(0)}(i) = d^{(0)}(i)$ | $M^{layer}_{symb} = M^{(0)}_{symb}$ |
| 2 | 2 | $x^{(0)}(i) = d^{(0)}(i)$<br>$x^{(1)}(i) = d^{(1)}(i)$ | $M^{layer}_{symb} = M^{(0)}_{symb} = M^{(1)}_{symb}$ |
| 3 | 2 | $x^{(0)}(i) = d^{(0)}(i)$<br>$x^{(1)}(i) = d^{(1)}(2i)$<br>$x^{(2)}(i) = d^{(1)}(2i + 1)$ | $M^{layer}_{symb} = M^{(0)}_{symb} = M^{(1)}_{symb}/2$ |
| 4 | 2 | $x^{(0)}(i) = d^{(0)}(2i)$<br>$x^{(1)}(i) = d^{(0)}(2i + 1)$<br>$x^{(2)}(i) = d^{(1)}(2i)$<br>$x^{(3)}(i) = d^{(1)}(2i + 1)$ | $M^{layer}_{symb} = M^{(0)}_{symb}/2 = M^{(1)}_{symb}/2$ |

According to Table 1, multi-codeword transmission is supported for up to 4 layers, i.e., 4 antenna ports. However, multi-codeword transmission for 6 or 8 antenna ports is not provided.

A method described below relates to codeword-to-layer mapping in MIMO transmission based on at least one codeword for a single user when the number of antenna ports is 6 or 8. MIMO transmission for up to two codewords is designed by considering complexity and feedback overhead of a system. Backward compatibility with the conventional 3GPP LTE is also considered.

Parameters to be used hereinafter are defined as follows.

$M^{(q)}_{symb}$: the number of modulation symbols for a codeword q $d^{(q)}(0), \ldots, d^{(q)}(M^{(q)}_{symb}-1)$: modulation symbols for the codeword q v: the number of layers $M^{layer}_{symb}$: the number of modulation symbols for each layer $x(i) = [x^{(0)}(i) \ldots x^{(v-1)}(i)]^T$, $i = 0, 1, \ldots, M^{layer}_{symb}-1$: mapping symbols mapped to layers In the drawings described below, 'CWn' denotes modulation symbols for a codeword n, and 'S/P' denotes a serial-to-parallel converter. There is no restriction on MIMO precoding performed in a precoder. Well-known schemes (e.g., cyclic delay diversity (CDD), space frequency block code (SFCB), space time block code (STBC), and a combination of them) may be used in the MIMO precoding.

Figure 3:
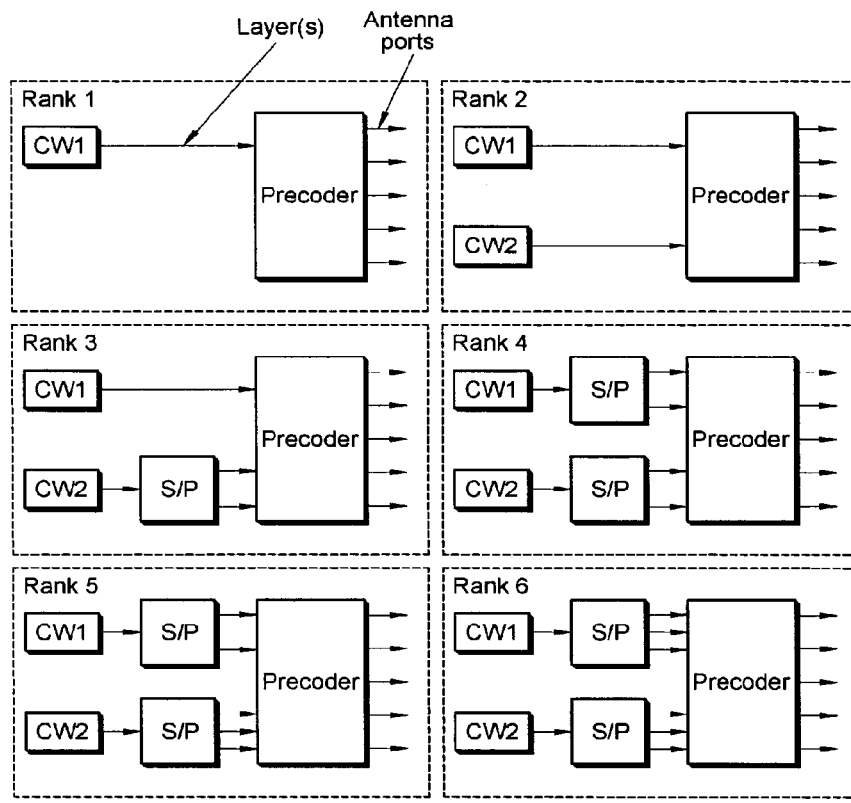
FIG. 3 shows layer mapping according to a 1st embodiment of the present invention.

FIG. 3 shows layer mapping according to a 1st embodiment of the present invention.

Herein, 6 antenna ports are used for layer mapping at ranks 1 to 6. This can be shown by Table 2.

Table 2

TABLE 2

| Number of layers | Number of code-words | Codeword-to-layer mapping, $i = 0, 1, \ldots, M^{layer}_{symb} - 1$ | |
|---|---|---|---|
| 1 | 1 | $x^{(0)}(i) = d^{(0)}(i)$ | $M^{layer}_{symb} = M^{(0)}_{symb}$ |
| 2 | 2 | $x^{(0)}(i) = d^{(0)}(i)$ $x^{(1)}(i) = d^{(1)}(i)$ | $M^{layer}_{symb} = M^{(0)}_{symb} = M^{(1)}_{symb}$ |
| 3 | 2 | $x^{(0)}(i) = d^{(0)}(i)$ $x^{(1)}(i) = d^{(1)}(2i)$ $x^{(2)}(i) = d^{(1)}(2i + 1)$ | $M^{layer}_{symb} = M^{(0)}_{symb} = M^{(1)}_{symb}/2$ |
| 4 | 2 | $x^{(0)}(i) = d^{(0)}(2i)$ $x^{(1)}(i) = d^{(0)}(2i + 1)$ $x^{(2)}(i) = d^{(1)}(2i)$ $x^{(3)}(i) = d^{(1)}(2i + 1)$ | $M^{layer}_{symb} = M^{(0)}_{symb}/2 = M^{(1)}_{symb}/2$ |
| 5 | 2 | $x^{(0)}(i) = d^{(0)}(2i)$ $x^{(1)}(i) = d^{(0)}(2i + 1)$ $x^{(2)}(i) = d^{(1)}(3i)$ $x^{(3)}(i) = d^{(1)}(3i + 1)$ $x^{(4)}(i) = d^{(1)}(3i + 2)$ | $M^{layer}_{symb} = M^{(0)}_{symb}/2 = M^{(1)}_{symb}/3$ |
| 6 | 2 | $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(3i)$ $x^{(4)}(i) = d^{(1)}(3i + 1)$ $x^{(5)}(i) = d^{(1)}(3i + 2)$ | $M^{layer}_{symb} = M^{(0)}_{symb}/3 = M^{(1)}_{symb}/3$ |

At the rank 3, a first codeword CW1 may be mapped to a first layer, and a second codeword CW2 may be arranged in a second layer and a third layer. Thus, a gain can be obtained when a receiver performs successive interference cancellation (SIC).

At the rank 4 or higher, inter-layer interference may be increased in proportion to the number of layers to be mapped for each codeword. According to the aforementioned layer mapping, codeword decoding performance can be optimized by equalizing codeword symbols to be mapped to each layer as much as possible. When the receiver performs the SIC, interference cancellation between layers mapped to the second codeword CW2 may be supported according to a channel decoding result of the first codeword CW1 or according to a soft value of a symbol level.

Figure 4:
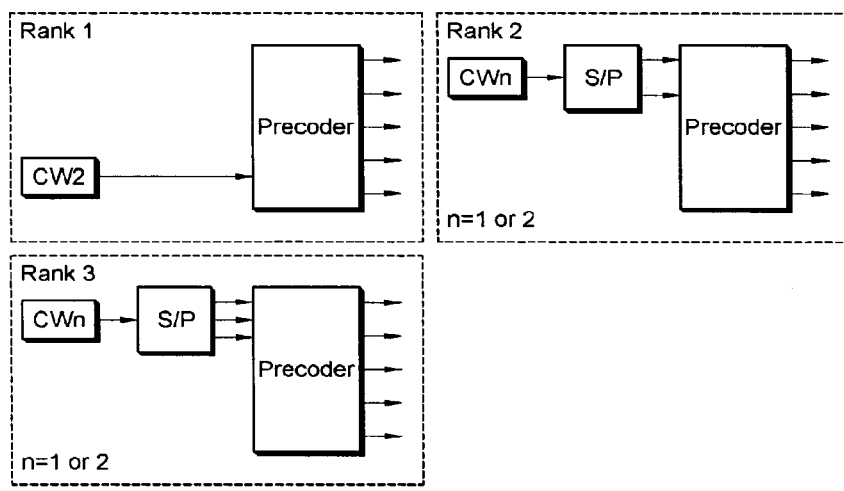
FIG. 4 shows extended mapping when layer mapping is performed according to a 1st embodiment of the present invention.

FIG. 4 shows extended mapping when layer mapping is performed according to the 1st embodiment of the present invention. This can be shown by Table 3.

Table 3

TABLE 3

| Number of layers | Number of code-words | Codeword-to-layer mapping, $i = 0, 1, \ldots, M^{layer}_{symb} - 1$ | |
|---|---|---|---|
| 1 | 1 | $x^{(0)}(i) = d^{(1)}(i)$ | $M^{layer}_{symb} = M^{(1)}_{symb}$ |
| 2 | 1 | $x^{(0)}(i) = d^{(n)}(2i)$ $x^{(1)}(i) = d^{(n)}(2i + 1)$ | $M^{layer}_{symb} = M^{(n)}_{symb}/2$, n = 1 or 2 |
| 3 | 1 | $x^{(0)}(i) = d^{(n)}(3i)$ $x^{(1)}(i) = d^{(n)}(3i + 1)$ $x^{(2)}(i) = d^{(n)}(3i + 2)$ | $M^{layer}_{symb} = M^{(n)}_{symb}/3$, n = 1 or 2 |

The extended mapping may be used as layer mapping for HARQ resources. When transmission of a first codeword is successful and transmission of a second codeword fails in initial transmission, the extended mapping is layer mapping for the failed codeword (i.e., the second codeword). Alternatively, the extended mapping may be used as layer mapping for supporting rank overriding.

Figure 5:
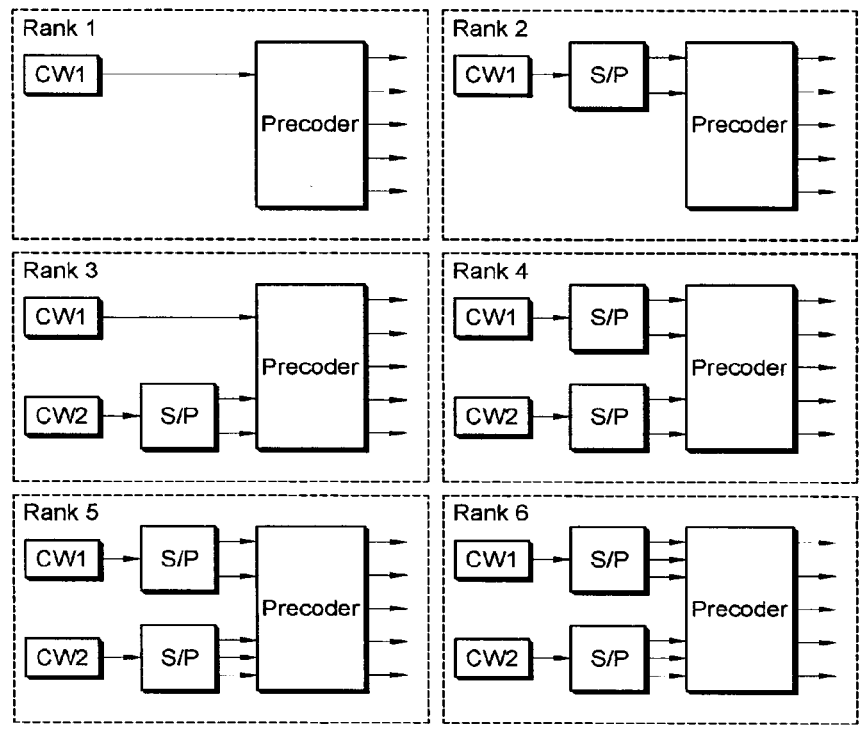
FIG. 5 shows layer mapping according to a 2nd embodiment of the present invention.

FIG. 5 shows layer mapping according to a 2nd embodiment of the present invention. Herein, 6 antenna ports are used for layer mapping at ranks 1 to 6. In single codeword transmission at the rank 2 or lower, transmission performance can be improved by increasing a channel coding gain of a codeword. This can be shown by Table 4.

Table 4

TABLE 4

| Number of layers | Number of code-words | Codeword-to-layer mapping, $i = 0, 1, \ldots, M^{layer}_{symb} - 1$ | |
|---|---|---|---|
| 1 | 1 | $x^{(0)}(i) = d^{(0)}(i)$ | $M^{layer}_{symb} = M^{(0)}_{symb}$ |
| 2 | 1 | $x^{(0)}(i) = d^{(0)}(2i)$ $x^{(1)}(i) = d^{(0)}(2i + 1)$ | $M^{layer}_{symb} = M^{(0)}_{symb}/2$ |
| 3 | 2 | $x^{(0)}(i) = d^{(0)}(i)$ $x^{(1)}(i) = d^{(1)}(2i)$ $x^{(2)}(i) = d^{(1)}(2i + 1)$ | $M^{layer}_{symb} = M^{(0)}_{symb} = M^{(1)}_{symb}/2$ |
| 4 | 2 | $x^{(0)}(i) = d^{(0)}(2i)$ $x^{(1)}(i) = d^{(0)}(2i + 1)$ $x^{(2)}(i) = d^{(1)}(2i)$ $x^{(3)}(i) = d^{(1)}(2i + 1)$ | $M^{layer}_{symb} = M^{(0)}_{symb}/2 = M^{(1)}_{symb}/2$ |
| 5 | 2 | $x^{(0)}(i) = d^{(0)}(2i)$ $x^{(1)}(i) = d^{(0)}(2i + 1)$ $x^{(2)}(i) = d^{(1)}(3i)$ $x^{(3)}(i) =$ | $M^{layer}_{symb} = M^{(0)}_{symb}/2 = M^{(1)}_{symb}/3$ |

TABLE 4-continued

| Number of layers | Number of codewords | Codeword-to-layer mapping, $i = 0, 1, \ldots, M_{symb}^{layer} - 1$ |
|---|---|---|
| 6 | 2 | $x^{(0)}(i) = d^{(0)}(3i)$  $M_{symb}^{layer} = M_{symb}^{(0)}/3 = M_{symb}^{(1)}/3$ <br> $x^{(1)}(i) = d^{(0)}(3i + 1)$ <br> $x^{(2)}(i) = d^{(0)}(3i + 2)$ <br> $x^{(3)}(i) = d^{(1)}(3i)$ <br> $x^{(4)}(i) = d^{(1)}(3i + 1)$ <br> $x^{(5)}(i) = d^{(1)}(3i + 2)$ |

Figure 6:
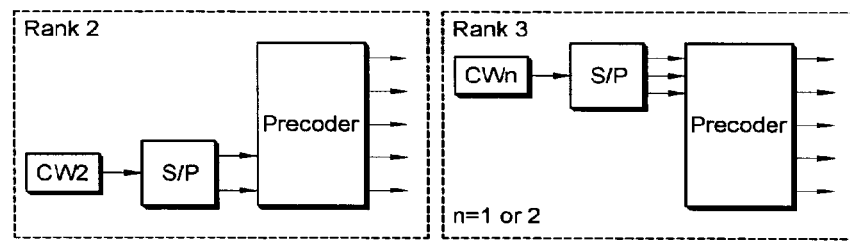
FIG. 6 shows extended mapping when layer mapping is performed according to a 2nd embodiment of the present invention.

FIG. 6 shows extended mapping when layer mapping is performed according to the 2nd embodiment of the present invention. The extended mapping is used to support HARQ retransmission or rank overriding, and this can be shown by Table 5.

Table 5

TABLE 5

| Number of layers | Number of codewords | Codeword-to-layer mapping, $i = 0, 1, \ldots, M_{symb}^{layer} - 1$ |
|---|---|---|
| 2 | 1 | $x^{(0)}(i) = d^{(1)}(2i)$  $M_{symb}^{layer} = M_{symb}^{(1)}/2$ <br> $x^{(1)}(i) = d^{(1)}(2i + 1)$ |
| 3 | 1 | $x^{(0)}(i) = d^{(n)}(3i)$  $M_{symb}^{layer} = M_{symb}^{(n)}/3$, n = 1 or 2 <br> $x^{(1)}(i) = d^{(n)}(3i + 1)$ <br> $x^{(2)}(i) = d^{(n)}(3i + 2)$ |

Figure 7:
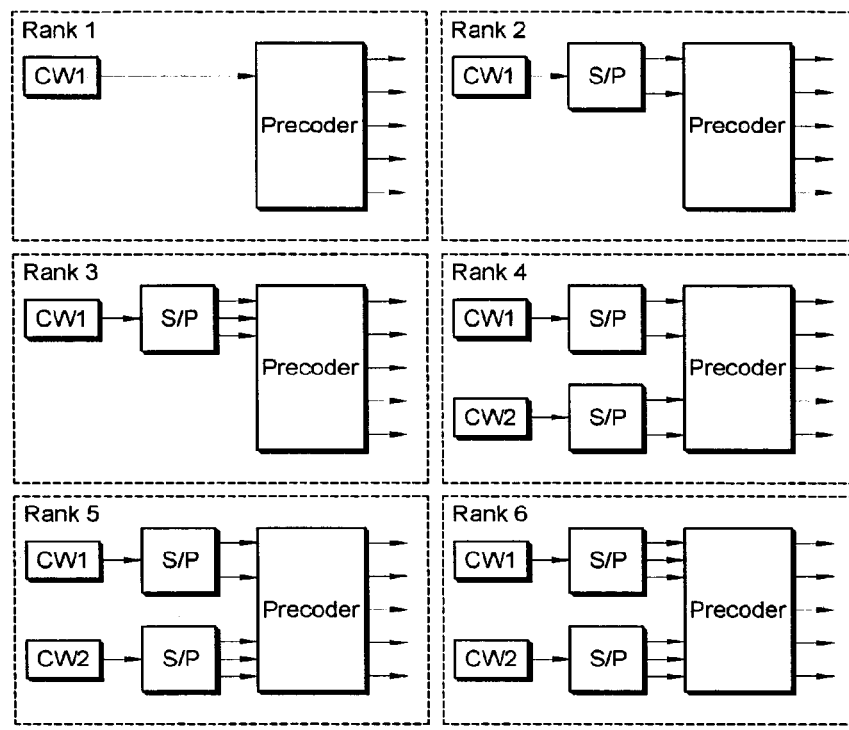
FIG. 7 shows layer mapping according to a 3rd embodiment of the present invention.

FIG. 7 shows layer mapping according to a 3rd embodiment of the present invention. Herein, 6 antenna ports are used for layer mapping at ranks 1 to 6. In single codeword transmission at the rank 3 or lower, transmission performance can be improved by increasing a channel coding gain of a codeword. This can be shown by Table 6.

Table 6

TABLE 6

| Number of layers | Number of codewords | Codeword-to-layer mapping, $i = 0, 1, \ldots, M_{symb}^{layer} - 1$ |
|---|---|---|
| 1 | 1 | $x^{(0)}(i) = d^{(0)}(i)$  $M_{symb}^{layer} = M_{symb}^{(0)}$ |
| 2 | 1 | $x^{(0)}(i) = d^{(0)}(2i)$  $M_{symb}^{layer} = M_{symb}^{(0)}/2$ <br> $x^{(1)}(i) = d^{(0)}(2i + 1)$ |
| 3 | 1 | $x^{(0)}(i) = d^{(0)}(3i)$  $M_{symb}^{layer} = M_{symb}^{(0)}/3$ <br> $x^{(1)}(i) = d^{(0)}(3i + 1)$ <br> $x^{(2)}(i) = d^{(0)}(3i + 2)$ |
| 4 | 2 | $x^{(0)}(i) = d^{(0)}(2i)$  $M_{symb}^{layer} = M_{symb}^{(0)}/2 = M_{symb}^{(1)}/2$ <br> $x^{(1)}(i) = d^{(0)}(2i + 1)$ <br> $x^{(2)}(i) = d^{(1)}(2i)$ <br> $x^{(3)}(i) = d^{(1)}(2i + 1)$ |
| 5 | 2 | $x^{(0)}(i) = d^{(0)}(2i)$  $M_{symb}^{layer} = M_{symb}^{(0)}/2 = M_{symb}^{(1)}/3$ <br> $x^{(1)}(i) = d^{(0)}(2i + 1)$ |

TABLE 6-continued

| Number of layers | Number of codewords | Codeword-to-layer mapping, $i = 0, 1, \ldots, M_{symb}^{layer} - 1$ |
|---|---|---|
| | | $x^{(2)}(i) = d^{(1)}(3i)$ <br> $x^{(3)}(i) = d^{(1)}(3i + 1)$ <br> $x^{(4)}(i) = d^{(1)}(3i + 2)$ |
| 6 | 2 | $x^{(0)}(i) = d^{(0)}(3i)$  $M_{symb}^{layer} = M_{symb}^{(0)}/3 = M_{symb}^{(1)}/3$ <br> $x^{(1)}(i) = d^{(0)}(3i + 1)$ <br> $x^{(2)}(i) = d^{(0)}(3i + 2)$ <br> $x^{(3)}(i) = d^{(1)}(3i)$ <br> $x^{(4)}(i) = d^{(1)}(3i + 1)$ <br> $x^{(5)}(i) = d^{(1)}(3i + 2)$ |

Figure 8:
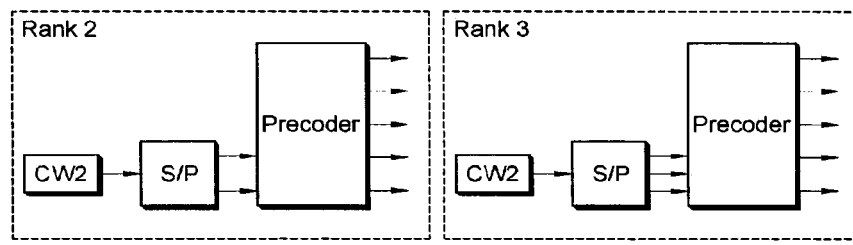
FIG. 8 shows extended mapping when layer mapping is performed according to a 3rd embodiment of the present invention.

FIG. 8 shows extended mapping when layer mapping is performed according to the 3rd embodiment of the present invention. The extended mapping is used to support HARQ retransmission or rank overriding, and this can be shown by Table 7.

Table 7

TABLE 7

| Number of layers | Number of codewords | Codeword-to-layer mapping, $i = 0, 1, \ldots, M_{symb}^{layer} - 1$ |
|---|---|---|
| 2 | 1 | $x^{(0)}(i) = d^{(1)}(2i)$  $M_{symb}^{layer} = M_{symb}^{(1)}/2$ <br> $x^{(1)}(i) = d^{(1)}(2i + 1)$ |
| 3 | 1 | $x^{(0)}(i) = d^{(1)}(3i)$  $M_{symb}^{layer} = M_{symb}^{(1)}/3$ <br> $x^{(1)}(i) = d^{(1)}(3i + 1)$ <br> $x^{(2)}(i) = d^{(1)}(3i + 2)$ |

Figure 9:
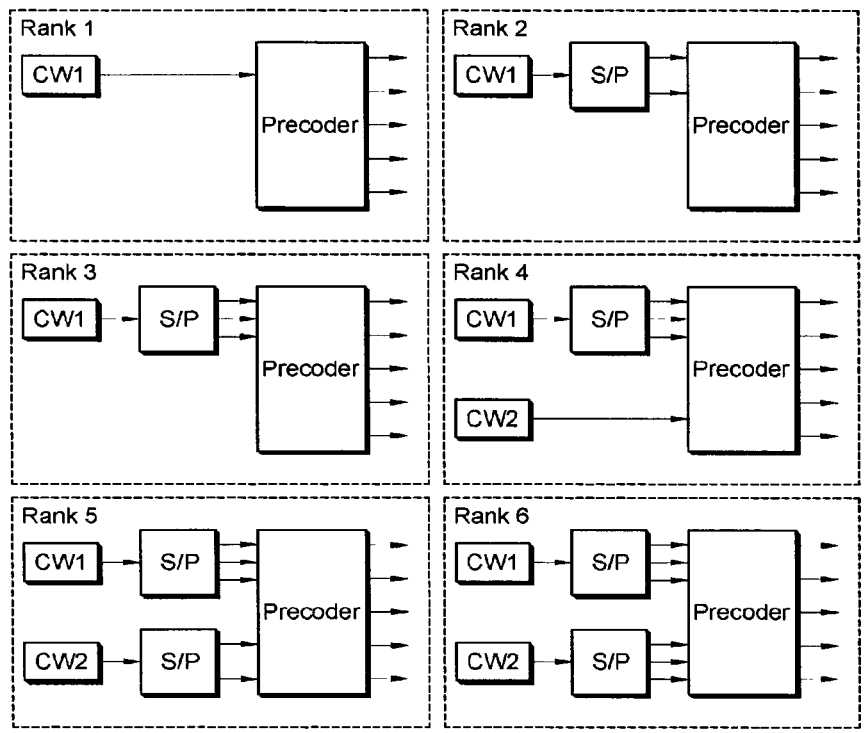
FIG. 9 shows layer mapping according to a 4th embodiment of the present invention.

FIG. 9 shows layer mapping according to a 4th embodiment of the present invention. Herein, 6 antenna ports are used for layer mapping at ranks 1 to 6. In single codeword transmission at the rank 3 or lower, a change in an aspect of mapping each codeword to layers at different ranks is minimized. In transmission using active rank adaptation, disparity between a modulation and coding scheme (MCS) used in transmission and a channel quality indicator (CQT) reported by the UE depending on the rank change can be minimized. This can be shown by Table 8.

Table 8

TABLE 8

| Number of layers | Number of codewords | Codeword-to-layer mapping, $i = 0, 1, \ldots, M_{symb}^{layer} - 1$ |
|---|---|---|
| 1 | 1 | $x^{(0)}(i) = d^{(0)}(i)$  $M_{symb}^{layer} = M_{symb}^{(0)}$ |
| 2 | 1 | $x^{(0)}(i) = d^{(0)}(2i)$  $M_{symb}^{layer} = M_{symb}^{(0)}/2$ <br> $x^{(1)}(i) = d^{(0)}(2i + 1)$ |
| 3 | 1 | $x^{(0)}(i) = d^{(0)}(3i)$  $M_{symb}^{layer} = M_{symb}^{(0)}/3$ <br> $x^{(1)}(i) = d^{(0)}(3i + 1)$ <br> $x^{(2)}(i) = d^{(0)}(3i + 2)$ |
| 4 | 2 | $x^{(0)}(i) = d^{(0)}(3i)$  $M_{symb}^{layer} = M_{symb}^{(0)}/3 = M_{symb}^{(1)}$ <br> $x^{(1)}(i) = d^{(0)}(3i + 1)$ <br> $x^{(2)}(i) = d^{(0)}(3i + 2)$ <br> $x^{(3)}(i) = d^{(1)}(i)$ |

TABLE 8-continued

| Number of layers | Number of codewords | Codeword-to-layer mapping, $i = 0, 1, \ldots, M_{symb}^{layer} - 1$ | |
|---|---|---|---|
| 5 | 2 | $x^{(0)}(i) = d^{(0)}(2i)$ $x^{(1)}(i) = d^{(0)}(2i+1)$ $x^{(2)}(i) = d^{(1)}(3i)$ $x^{(3)}(i) = d^{(1)}(3i+1)$ $x^{(4)}(i) = d^{(1)}(3i+2)$ | $M_{symb}^{layer} = M_{symb}^{(0)}/2 = M_{symb}^{(1)}/3$ |
| 6 | 2 | $x^{(0)}(i) = d^{(0)}(3i)$ $x^{(1)}(i) = d^{(0)}(3i+1)$ $x^{(2)}(i) = d^{(0)}(3i+2)$ $x^{(3)}(i) = d^{(1)}(3i)$ $x^{(4)}(i) = d^{(1)}(3i+1)$ $x^{(5)}(i) = d^{(1)}(3i+2)$ | $M_{symb}^{layer} = M_{symb}^{(0)}/3 = M_{symb}^{(1)}/3$ |

Figure 10:
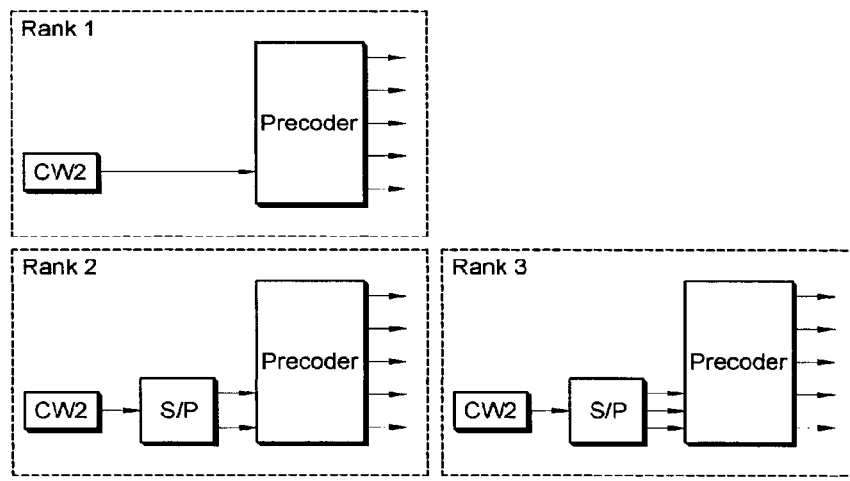
FIG. 10 shows extended mapping when layer mapping is performed according to a 4th embodiment of the present invention.

FIG. 10 shows extended mapping when layer mapping is performed according to the 4th embodiment of the present invention. The extended mapping is used to support HARQ retransmission or rank overriding, and this can be shown by Table 9.

Table 9

TABLE 9

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(1)}(i)$ | $M_{symb}^{layer} = M_{symb}^{(1)}$ |
| 2 | 1 | $x^{(0)}(i) = d^{(1)}(2i)$ $x^{(1)}(i) = d^{(1)}(2i+1)$ | $M_{symb}^{layer} = M_{symb}^{(1)}/2$ |
| 3 | 1 | $x^{(0)}(i) = d^{(1)}(3i)$ $x^{(1)}(i) = d^{(1)}(3i+1)$ $x^{(2)}(i) = d^{(1)}(3i+2)$ | $M_{symb}^{layer} = M_{symb}^{(1)}/3$ |

Figure 11:
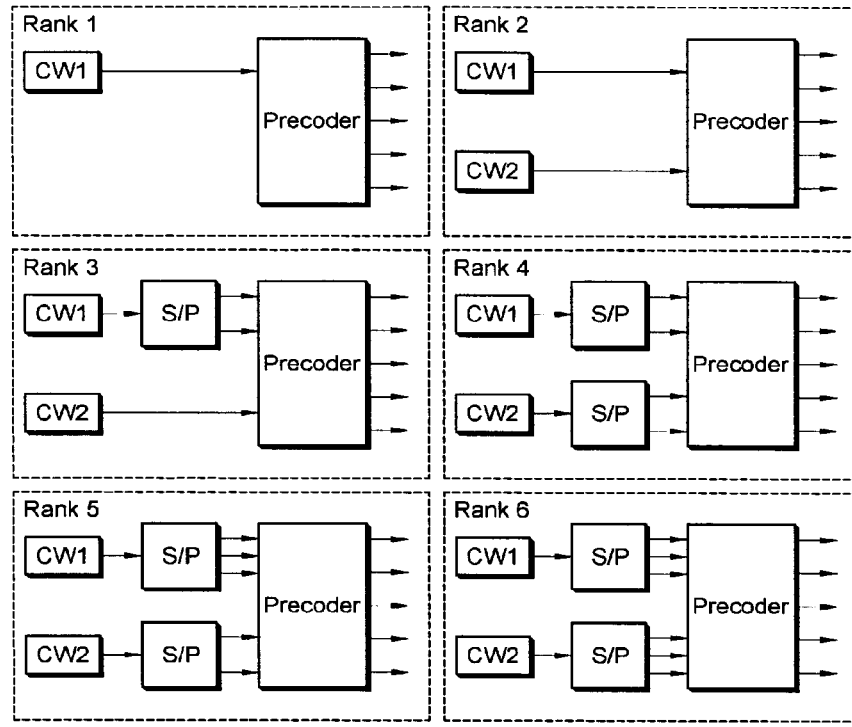
FIG. 11 shows layer mapping according to a 5th embodiment of the present invention.

FIG. 11 shows layer mapping according to a 5th embodiment of the present invention. Herein, 6 antenna ports are used for layer mapping at ranks 1 to 6. When the receiver performs the SIC, layer mapping on each codeword is naturally increased according to a codeword index along with the increase of the ranks while codeword symbols mapped to each layer are equalized as mush as possible, thereby optimizing codeword decoding performance. This can be shown by Table 10.

Table 10

TABLE 10

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 3 | 2 | $x^{(0)}(i) = d^{(0)}(2i)$ $x^{(1)}(i) = d^{(0)}(2i+1)$ $x^{(2)}(i) = d^{(1)}(i)$ | $M_{symb}^{layer} = M_{symb}^{(0)}/2 = M_{symb}^{(1)}$ |
| 4 | 2 | $x^{(0)}(i) = d^{(0)}(2i)$ $x^{(1)}(i) = d^{(0)}(2i+1)$ $x^{(2)}(i) = d^{(1)}(2i)$ | $M_{symb}^{layer} = M_{symb}^{(0)}/2 = M_{symb}^{(1)}/2$ |

TABLE 10-continued

| Number of layers | Number of codewords | Codeword-to-layer mapping, $i = 0, 1, \ldots, M_{symb}^{layer} - 1$ | |
|---|---|---|---|
| 5 | 2 | $x^{(3)}(i) = d^{(1)}(2i+1)$ $x^{(0)}(i) = d^{(0)}(3i)$ $x^{(1)}(i) = d^{(0)}(3i+1)$ $x^{(2)}(i) = d^{(0)}(3i+2)$ $x^{(3)}(i) = d^{(1)}(2i)$ $x^{(4)}(i) = d^{(1)}(2i+1)$ | $M_{symb}^{layer} = M_{symb}^{(0)}/3 = M_{symb}^{(1)}/2$ |
| 6 | 2 | $x^{(0)}(i) = d^{(0)}(3i)$ $x^{(1)}(i) = d^{(0)}(3i+1)$ $x^{(2)}(i) = d^{(0)}(3i+2)$ $x^{(3)}(i) = d^{(1)}(3i)$ $x^{(4)}(i) = d^{(1)}(3i+1)$ $x^{(5)}(i) = d^{(1)}(3i+2)$ | $M_{symb}^{layer} = M_{symb}^{(0)}/3 = M_{symb}^{(1)}/3$ |

Figure 12:
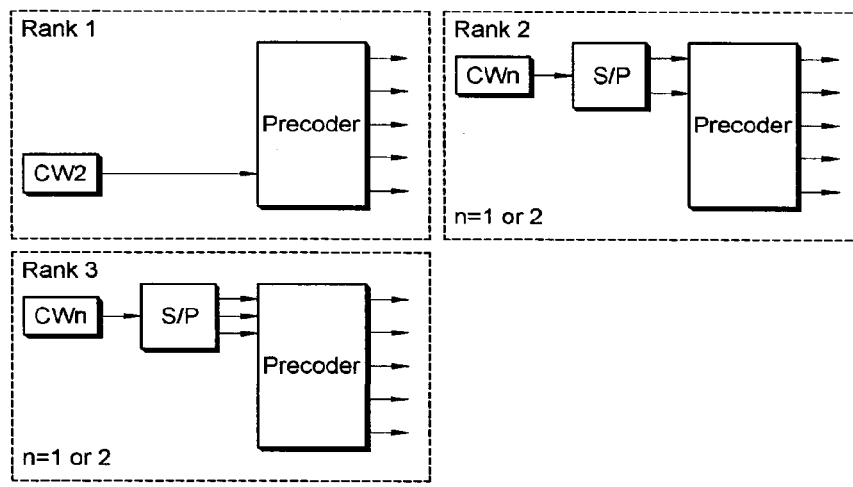
FIG. 12 shows extended mapping when layer mapping is performed according to a 5th embodiment of the present invention.

FIG. 12 shows extended mapping when layer mapping is performed according to the 5th embodiment of the present invention. The extended mapping is used to support HARQ retransmission or rank overriding, and this can be shown by Table 11.

Table 11

TABLE 11

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(1)}(i)$ | $M_{symb}^{layer} = M_{symb}^{(1)}$ |
| 2 | 1 | $x^{(0)}(i) = d^{(n)}(2i)$ $x^{(1)}(i) = d^{(n)}(2i+1)$ | $M_{symb}^{layer} = M_{symb}^{(n)}/2$, n = 1 or 2 |
| 3 | 1 | $x^{(0)}(i) = d^{(n)}(3i)$ $x^{(1)}(i) = d^{(n)}(3i+1)$ $x^{(2)}(i) = d^{(n)}(3i+2)$ | $M_{symb}^{layer} = M_{symb}^{(n)}/3$, n = 1 or 2 |

Figure 13:
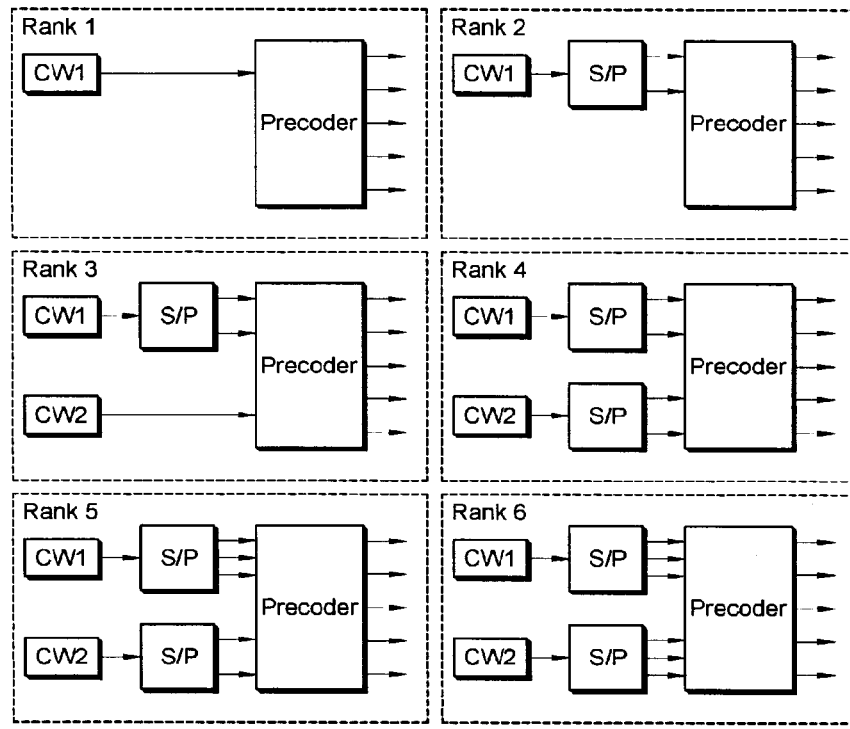
FIG. 13 shows layer mapping according to a 6th embodiment of the present invention.

FIG. 13 shows layer mapping according to a 6th embodiment of the present invention. Herein, 6 antenna ports are used for layer mapping at ranks 1 to 6. Only a single codeword is transmitted at the rank 2 or lower by basically using the layer mapping according to the 5th embodiment. Thus, when an SCI gain of the receiver is small, transmission performance can be improved by increasing a channel coding gain of the single codeword. This can be shown by Table 12.

Table 12

TABLE 12

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 3 | 2 | $x^{(0)}(i) = d^{(0)}(2i)$ $x^{(1)}(i) =$ | $M_{symb}^{layer} = M_{symb}^{(0)}/2 = M_{symb}^{(1)}$ |

TABLE 12-continued

| Number of layers | Number of codewords | Codeword-to-layer mapping, $i = 0, 1, ..., M_{symb}^{layer} - 1$ | |
|---|---|---|---|
| 4 | 2 | $x^{(0)}(i) = d^{(0)}(2i)$<br>$x^{(1)}(i) = d^{(0)}(2i+1)$<br>$x^{(2)}(i) = d^{(1)}(i)$<br>$x^{(3)}(i) = d^{(1)}(2i+1)$ | $M_{symb}^{layer} = M_{symb}^{(0)}/2 = M_{symb}^{(1)}/2$ |
| 5 | 2 | $x^{(0)}(i) = d^{(0)}(3i)$<br>$x^{(1)}(i) = d^{(0)}(3i+1)$<br>$x^{(2)}(i) = d^{(0)}(3i+2)$<br>$x^{(3)}(i) = d^{(1)}(2i)$<br>$x^{(4)}(i) = d^{(1)}(2i+1)$ | $M_{symb}^{layer} = M_{symb}^{(0)}/3 = M_{symb}^{(1)}/2$ |
| 6 | 2 | $x^{(0)}(i) = d^{(0)}(3i)$<br>$x^{(1)}(i) = d^{(0)}(3i+1)$<br>$x^{(2)}(i) = d^{(0)}(3i+2)$<br>$x^{(3)}(i) = d^{(1)}(3i)$<br>$x^{(4)}(i) = d^{(1)}(3i+1)$<br>$x^{(5)}(i) = d^{(1)}(3i+2)$ | $M_{symb}^{layer} = M_{symb}^{(0)}/3 = M_{symb}^{(1)}/3$ |

Figure 14:
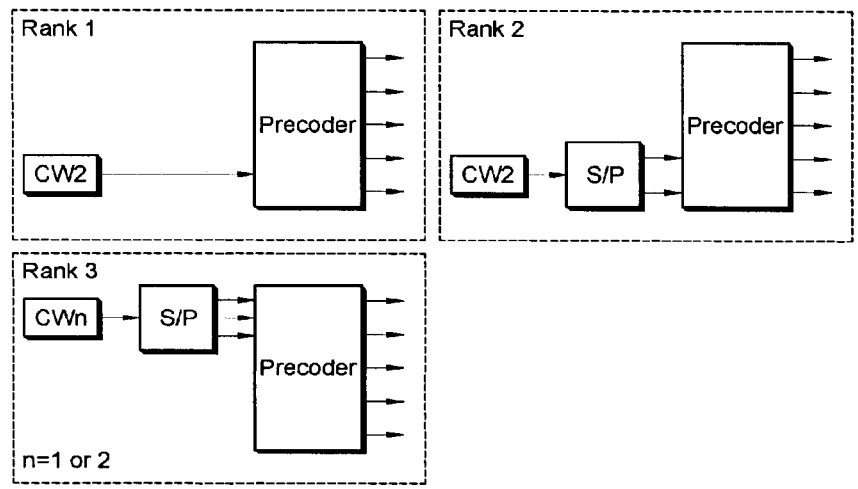
FIG. 14 shows extended mapping when layer mapping is performed according to a 6th embodiment of the present invention.

FIG. 14 shows extended mapping when layer mapping is performed according to the 6th embodiment of the present invention. The extended mapping is used to support HARQ retransmission or rank overriding, and this can be shown by Table 13.

Table 13

TABLE 13

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(1)}(i)$ | $M_{symb}^{layer} = M_{symb}^{(1)}$ |
| 2 | 1 | $x^{(0)}(i) = d^{(1)}(2i)$<br>$x^{(1)}(i) = d^{(1)}(2i+1)$ | $M_{symb}^{layer} = M_{symb}^{(1)}/2$ |
| 3 | 1 | $x^{(0)}(i) = d^{(n)}(3i)$<br>$x^{(1)}(i) = d^{(n)}(3i+1)$<br>$x^{(2)}(i) = d^{(n)}(3i+2)$ | $M_{symb}^{layer} = M_{symb}^{(n)}/3$, n = 1 or 2 |

Figure 15:
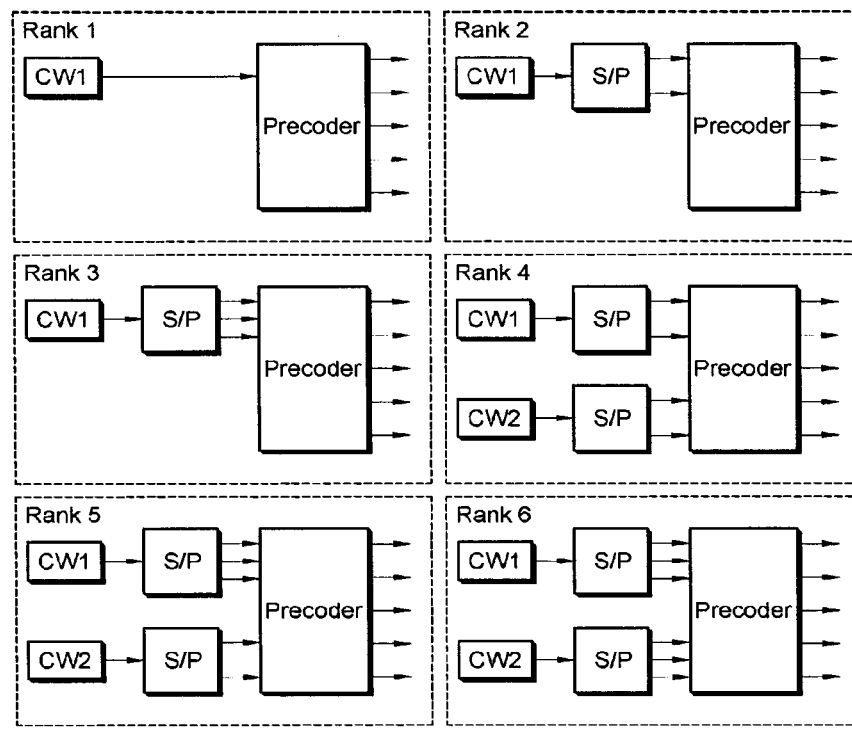
FIG. 15 shows layer mapping according to a 7th embodiment of the present invention.

FIG. 15 shows layer mapping according to a 7th embodiment of the present invention. Herein, 6 antenna ports are used for layer mapping at ranks 1 to 6. Only a single codeword is transmitted at the rank 2 or lower by basically using the layer mapping according to the 5th embodiment. Thus, when the SCI gain of the receiver is small, transmission performance can be improved by increasing a channel coding gain of the single codeword. This can be shown by Table 14.

Table 14

TABLE 14

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$<br>$x^{(1)}(i) = d^{(0)}(2i+1)$ | $M_{symb}^{layer} = M_{symb}^{(0)}/2$ |
| 3 | 1 | $x^{(0)}(i) = d^{(0)}(3i)$<br>$x^{(1)}(i) = d^{(0)}(3i+1)$<br>$x^{(2)}(i) = d^{(0)}(3i+2)$ | $M_{symb}^{layer} = M_{symb}^{(0)}/3$ |
| 4 | 2 | $x^{(0)}(i) = d^{(0)}(2i)$<br>$x^{(1)}(i) = d^{(0)}(2i+1)$<br>$x^{(2)}(i) = d^{(1)}(2i)$<br>$x^{(3)}(i) = d^{(1)}(2i+1)$ | $M_{symb}^{layer} = M_{symb}^{(0)}/2 = M_{symb}^{(1)}/2$ |
| 5 | 2 | $x^{(0)}(i) = d^{(0)}(3i)$<br>$x^{(1)}(i) = d^{(0)}(3i+1)$<br>$x^{(2)}(i) = d^{(0)}(3i+2)$<br>$x^{(3)}(i) = d^{(1)}(2i)$<br>$x^{(4)}(i) = d^{(1)}(2i+1)$ | $M_{symb}^{layer} = M_{symb}^{(0)}/3 = M_{symb}^{(1)}/2$ |
| 6 | 2 | $x^{(0)}(i) = d^{(0)}(3i)$<br>$x^{(1)}(i) = d^{(0)}(3i+1)$<br>$x^{(2)}(i) = d^{(0)}(3i+2)$<br>$x^{(3)}(i) = d^{(1)}(3i)$<br>$x^{(4)}(i) = d^{(1)}(3i+1)$<br>$x^{(5)}(i) = d^{(1)}(3i+2)$ | $M_{symb}^{layer} = M_{symb}^{(0)}/3 = M_{symb}^{(1)}/3$ |

Figure 16:
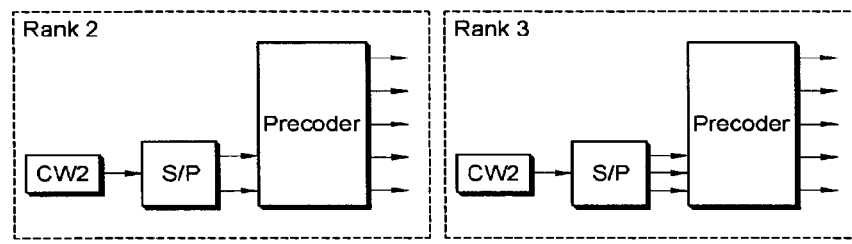
FIG. 16 shows extended mapping when layer mapping is performed according to a 7th embodiment of the present invention.

FIG. 16 shows extended mapping when layer mapping is performed according to the 7th embodiment of the present invention. The extended mapping is used to support HARQ retransmission or rank overriding, and this can be shown by Table 15.

Table 15

TABLE 15

| Number of layers | Number of codewords | Codeword-to-layer mapping, $i = 0, 1, \ldots, M_{symb}^{layer} - 1$ | |
|---|---|---|---|
| 2 | 1 | $x^{(0)}(i) = d^{(1)}(2i)$<br>$x^{(1)}(i) = d^{(1)}(2i+1)$ | $M_{symb}^{layer} = M_{symb}^{(1)}/2$ |
| 3 | 1 | $x^{(0)}(i) = d^{(1)}(3i)$<br>$x^{(1)}(i) = d^{(1)}(3i+1)$<br>$x^{(2)}(i) = d^{(1)}(3i+2)$ | $M_{symb}^{layer} = M_{symb}^{(1)}/3$ |

Figure 17:
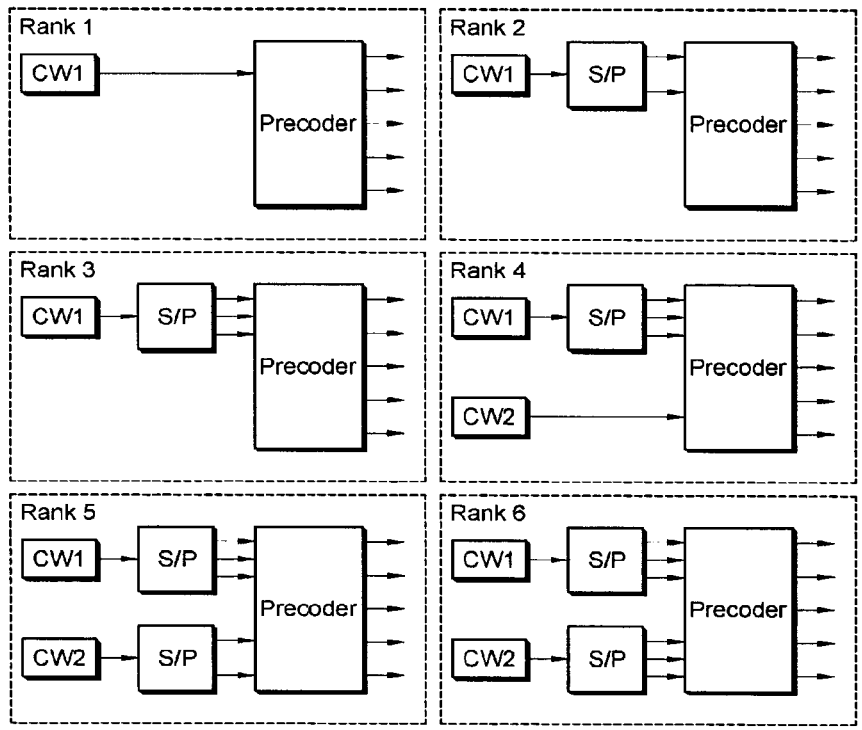
FIG. 17 shows layer mapping according to an 8th embodiment of the present invention.

FIG. 17 shows layer mapping according to an 8th embodiment of the present invention. Herein, 6 antenna ports are used for layer mapping at ranks 1 to 6.

Only a single codeword is transmitted at the rank 3 or lower by basically using the layer mapping according to the 5th embodiment. A change in an aspect of mapping each codeword to layers at different ranks is minimized. In transmission using active rank adaptation, disparity between the MCS used in transmission and the CQI reported by the UE depending on the rank change can be minimized. This can be shown by Table 16.

Table 16

TABLE 16

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$<br>$x^{(1)}(i) = d^{(0)}(2i+1)$ | $M_{symb}^{layer} = M_{symb}^{(0)}/2$ |
| 3 | 1 | $x^{(0)}(i) = d^{(0)}(3i)$<br>$x^{(1)}(i) = d^{(0)}(3i+1)$<br>$x^{(2)}(i) = d^{(0)}(3i+2)$ | $M_{symb}^{layer} = M_{symb}^{(0)}/3$ |
| 4 | 2 | $x^{(0)}(i) = d^{(0)}(3i)$<br>$x^{(1)}(i) = d^{(0)}(3i+1)$<br>$x^{(2)}(i) = d^{(0)}(3i+2)$<br>$x^{(3)}(i) = d^{(1)}(i)$ | $M_{symb}^{layer} = M_{symb}^{(0)}/3 = M_{symb}^{(1)}$ |
| 5 | 2 | $x^{(0)}(i) = d^{(0)}(3i)$<br>$x^{(1)}(i) = d^{(0)}(3i+1)$<br>$x^{(2)}(i) = d^{(0)}(3i+2)$<br>$x^{(3)}(i) = d^{(1)}(2i)$<br>$x^{(4)}(i) = d^{(1)}(2i+1)$ | $M_{symb}^{layer} = M_{symb}^{(0)}/3 = M_{symb}^{(1)}/2$ |

TABLE 16-continued

| Number of layers | Number of codewords | Codeword-to-layer mapping, $i = 0, 1, \ldots, M_{symb}^{layer} - 1$ | |
|---|---|---|---|
| 6 | 2 | $x^{(0)}(i) = d^{(0)}(3i)$ | $M_{symb}^{layer} =$ $M_{symb}^{(0)}/3 = M_{symb}^{(1)}/3$ |
|   |   | $x^{(1)}(i) = d^{(0)}(3i + 1)$ | |
|   |   | $x^{(2)}(i) = d^{(0)}(3i + 2)$ | |
|   |   | $x^{(3)}(i) = d^{(1)}(3i)$ | |
|   |   | $x^{(4)}(i) = d^{(1)}(3i + 1)$ | |
|   |   | $x^{(5)}(i) = d^{(1)}(3i + 2)$ | |

Figure 18:
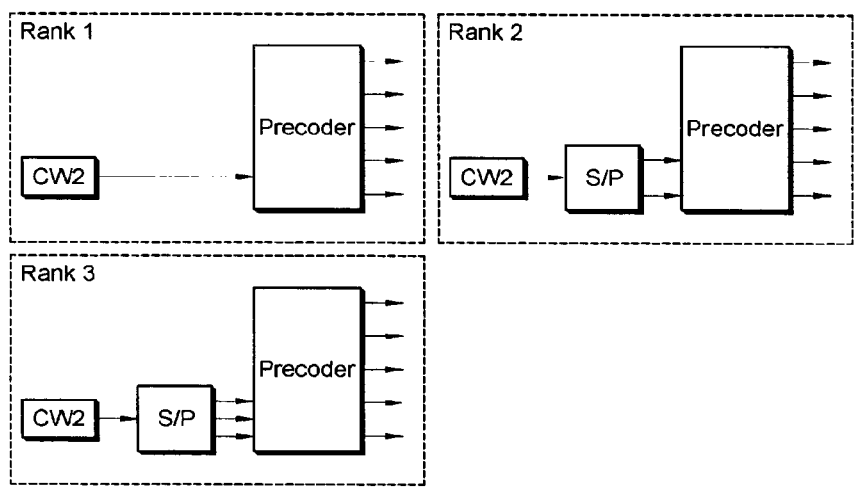
FIG. 18 shows extended mapping when layer mapping is performed according to an 8th embodiment of the present invention.

FIG. 18 shows extended mapping when layer mapping is performed according to the 8th embodiment of the present invention. The extended mapping is used to support HARQ retransmission or rank overriding, and this can be shown by Table 17.

Table 17

TABLE 17

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(1)}(i)$ | $M_{symb}^{layer} = M_{symb}^{(1)}$ |
| 2 | 1 | $x^{(0)}(i) = d^{(1)}(2i)$ | $M_{symb}^{layer} = M_{symb}^{(1)}/2$ |
|   |   | $x^{(1)}(i) = d^{(1)}(2i + 1)$ | |
| 3 | 1 | $x^{(0)}(i) = d^{(1)}(3i)$ | $M_{symb}^{layer} = M_{symb}^{(1)}/3$ |
|   |   | $x^{(1)}(i) = d^{(1)}(3i + 1)$ | |
|   |   | $x^{(2)}(i) = d^{(1)}(3i + 2)$ | |

In layer mapping to be described now, 8 antenna ports are used at ranks 1 to 8.

Figure 19:
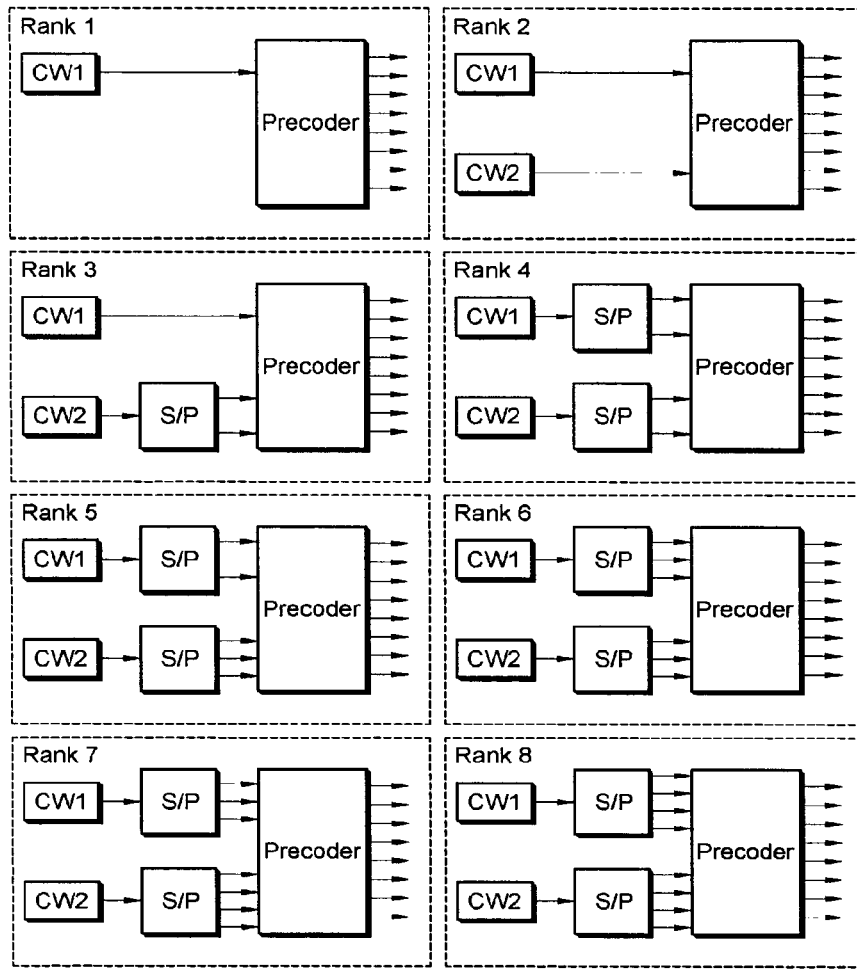
FIG. 19 shows layer mapping according to a 9th embodiment of the present invention.

FIG. 19 shows layer mapping according to a 9th embodiment of the present invention. At the rank 4 or higher, inter-layer interference may increase in proportion to the number of layers to be mapped for each codeword. Thus, codeword decoding performance can be optimized by equalizing codeword symbols to be mapped to each layer as much as possible. This is for supporting backward compatibility with the 3GPP LTE. A mapping method for each rank can be shown by Tables 18 and 19.

Table 18

TABLE 18

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ | $M_{symb}^{layer} =$ $M_{symb}^{(0)} = M_{symb}^{(1)}$ |
|   |   | $x^{(1)}(i) = d^{(1)}(i)$ | |
| 3 | 2 | $x^{(0)}(i) = d^{(0)}(i)$ | $M_{symb}^{layer} =$ $M_{symb}^{(0)} = M_{symb}^{(1)}/2$ |
|   |   | $x^{(1)}(i) = d^{(1)}(2i)$ | |
|   |   | $x^{(2)}(i) = d^{(1)}(2i + 1)$ | |
| 4 | 2 | $x^{(0)}(i) = d^{(0)}(2i)$ | $M_{symb}^{layer} =$ $M_{symb}^{(0)}/2 = M_{symb}^{(1)}/2$ |
|   |   | $x^{(1)}(i) = d^{(0)}(2i + 1)$ | |
|   |   | $x^{(2)}(i) = d^{(1)}(2i)$ | |
|   |   | $x^{(3)}(i) = d^{(1)}(2i + 1)$ | |
| 5 | 2 | $x^{(0)}(i) = d^{(0)}(2i)$ | $M_{symb}^{layer} =$ $M_{symb}^{(0)}/2 = M_{symb}^{(1)}/3$ |
|   |   | $x^{(1)}(i) = d^{(0)}(2i + 1)$ | |
|   |   | $x^{(2)}(i) = d^{(1)}(3i)$ | |
|   |   | $x^{(3)}(i) = d^{(1)}(3i + 1)$ | |
|   |   | $x^{(4)}(i) = d^{(1)}(3i + 2)$ | |
| 6 | 2 | $x^{(0)}(i) = d^{(0)}(3i)$ | $M_{symb}^{layer} =$ $M_{symb}^{(0)}/3 = M_{symb}^{(1)}/3$ |
|   |   | $x^{(1)}(i) = d^{(0)}(3i + 1)$ | |
|   |   | $x^{(2)}(i) = d^{(0)}(3i + 2)$ | |
|   |   | $x^{(3)}(i) = d^{(1)}(3i)$ | |
|   |   | $x^{(4)}(i) = d^{(1)}(3i + 1)$ | |
|   |   | $x^{(5)}(i) = d^{(1)}(3i + 2)$ | |

Table 19

TABLE 19

| Number of layers | Number of codewords | Codeword-to-layer mapping, $i = 0, 1, \ldots, M_{symb}^{layer} - 1$ | |
|---|---|---|---|
| 7 | 2 | $x^{(0)}(i) = d^{(0)}(3i)$ | $M_{symb}^{layer} =$ $M_{symb}^{(0)}/3 = M_{symb}^{(1)}/4$ |
|   |   | $x^{(1)}(i) = d^{(0)}(3i + 1)$ | |
|   |   | $x^{(2)}(i) = d^{(0)}(3i + 2)$ | |
|   |   | $x^{(3)}(i) = d^{(1)}(4i)$ | |
|   |   | $x^{(4)}(i) = d^{(1)}(4i + 1)$ | |
|   |   | $x^{(5)}(i) = d^{(1)}(4i + 2)$ | |
|   |   | $x^{(6)}(i) = d^{(1)}(4i + 3)$ | |
| 8 | 2 | $x^{(0)}(i) = d^{(0)}(4i)$ | $M_{symb}^{layer} =$ $M_{symb}^{(0)}/4 = M_{symb}^{(1)}/4$ |
|   |   | $x^{(1)}(i) = d^{(0)}(4i + 1)$ | |
|   |   | $x^{(2)}(i) = d^{(0)}(4i + 2)$ | |
|   |   | $x^{(3)}(i) = d^{(0)}(4i + 3)$ | |
|   |   | $x^{(4)}(i) = d^{(1)}(4i)$ | |
|   |   | $x^{(5)}(i) = d^{(1)}(4i + 1)$ | |
|   |   | $x^{(6)}(i) = d^{(1)}(4i + 2)$ | |
|   |   | $x^{(7)}(i) = d^{(1)}(4i + 3)$ | |

Figure 20:
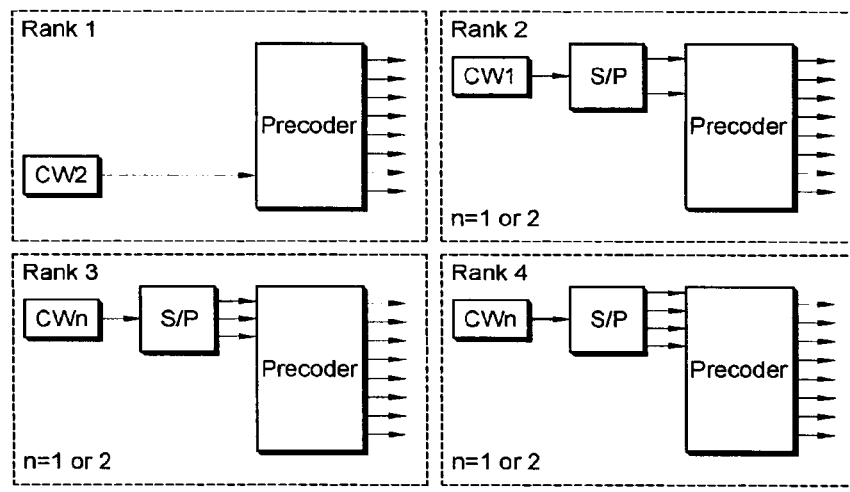
FIG. 20 shows extended mapping when layer mapping is performed according to a 9th embodiment of the present invention.

FIG. 20 shows extended mapping when layer mapping is performed according to the 9th embodiment of the present invention. The extended mapping is used to support HARQ retransmission or rank overriding, and this can be shown by Table 20.

Table 20

TABLE 20

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(1)}(i)$ | $M_{symb}^{layer} = M_{symb}^{(1)}$ |
| 2 | 1 | $x^{(0)}(i) = d^{(n)}(2i)$ | $M_{symb}^{layer} =$ $M_{symb}^{(n)}/2$, n = 1 or 2 |
|   |   | $x^{(1)}(i) = d^{(n)}(2i + 1)$ | |
| 3 | 1 | $x^{(0)}(i) = d^{(n)}(3i)$ | $M_{symb}^{layer} =$ $M_{symb}^{(n)}/3$, n = 1 or 2 |
|   |   | $x^{(1)}(i) = d^{(n)}(3i + 1)$ | |
|   |   | $x^{(2)}(i) = d^{(n)}(3i + 2)$ | |
| 4 | 1 | $x^{(0)}(i) = d^{(n)}(4i)$ | $M_{symb}^{layer} =$ $M_{symb}^{(n)}/4$, n = 1 or 2 |
|   |   | $x^{(1)}(i) = d^{(n)}(4i + 1)$ | |
|   |   | $x^{(2)}(i) = d^{(n)}(4i + 2)$ | |
|   |   | $x^{(3)}(i) = d^{(n)}(4i + 3)$ | |

Figure 21:
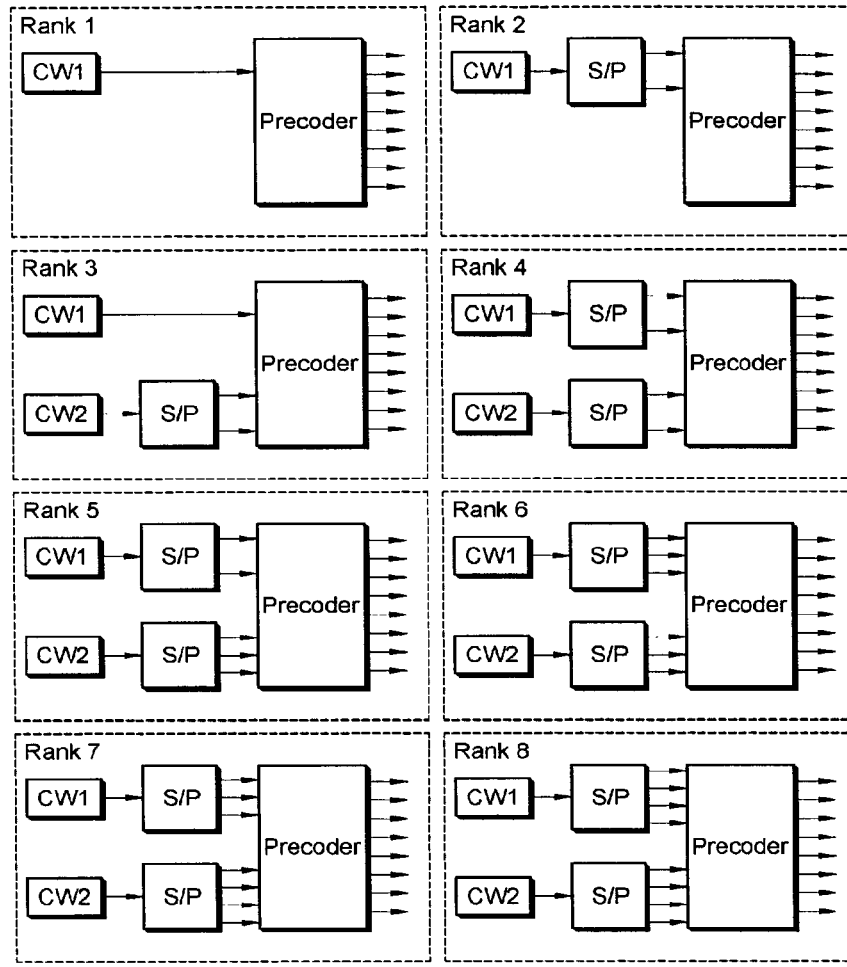
FIG. 21 shows layer mapping according to a 10th embodiment of the present invention.

FIG. 21 shows layer mapping according to a 10th embodiment of the present invention. In single codeword transmission at a rank 2 or lower, transmission performance can be improved by increasing a channel coding gain of a codeword. This can be shown by Tables 21 and 22.

Table 21

TABLE 21

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ | $M_{symb}^{layer} = M_{symb}^{(0)}/2$ |
|   |   | $x^{(1)}(i) = d^{(0)}(2i + 1)$ | |
| 3 | 2 | $x^{(0)}(i) = d^{(0)}(i)$ | $M_{symb}^{layer} =$ $M_{symb}^{(0)} = M_{symb}^{(1)}/2$ |
|   |   | $x^{(1)}(i) = d^{(1)}(2i)$ | |
|   |   | $x^{(2)}(i) = d^{(1)}(2i + 1)$ | |
| 4 | 2 | $x^{(0)}(i) = d^{(0)}(2i)$ | $M_{symb}^{layer} =$ $M_{symb}^{(0)}/2 = M_{symb}^{(1)}/2$ |
|   |   | $x^{(1)}(i) = d^{(0)}(2i + 1)$ | |
|   |   | $x^{(2)}(i) = d^{(1)}(2i)$ | |
|   |   | $x^{(3)}(i) = d^{(1)}(2i + 1)$ | |
| 5 | 2 | $x^{(0)}(i) = d^{(0)}(2i)$ | $M_{symb}^{layer} =$ $M_{symb}^{(0)}/2 = M_{symb}^{(1)}/3$ |
|   |   | $x^{(1)}(i) = d^{(0)}(2i + 1)$ | |
|   |   | $x^{(2)}(i) = d^{(1)}(3i)$ | |
|   |   | $x^{(3)}(i) = d^{(1)}(3i + 1)$ | |
|   |   | $x^{(4)}(i) = d^{(1)}(3i + 2)$ | |
| 6 | 2 | $x^{(0)}(i) = d^{(0)}(3i)$ | $M_{symb}^{layer} =$ $M_{symb}^{(0)}/3 = M_{symb}^{(1)}/3$ |
|   |   | $x^{(1)}(i) = d^{(0)}(3i + 1)$ | |

TABLE 21-continued

| Number of layers | Number of codewords | Codeword-to-layer mapping, $i = 0, 1, \ldots, M_{symb}^{layer} - 1$ |
|---|---|---|
| | | $x^{(2)}(i) = d^{(0)}(3i + 2)$ |
| | | $x^{(3)}(i) = d^{(1)}(3i)$ |
| | | $x^{(4)}(i) = d^{(1)}(3i + 1)$ |
| | | $x^{(5)}(i) = d^{(1)}(3i + 2)$ |

Table 22

TABLE 22

| Number of layers | Number of codewords | Codeword-to-layer mapping, $i = 0, 1, \ldots, M_{symb}^{layer} - 1$ | |
|---|---|---|---|
| 7 | 2 | $x^{(0)}(i) = d^{(0)}(3i)$ | $M_{symb}^{layer} =$ |
| | | $x^{(1)}(i) = d^{(0)}(3i + 1)$ | $M_{symb}^{(0)}/3 = M_{symb}^{(1)}/4$ |
| | | $x^{(2)}(i) = d^{(0)}(3i + 2)$ | |
| | | $x^{(3)}(i) = d^{(1)}(4i)$ | |
| | | $x^{(4)}(i) = d^{(1)}(4i + 1)$ | |
| | | $x^{(5)}(i) = d^{(1)}(4i + 2)$ | |
| | | $x^{(6)}(i) = d^{(1)}(4i + 3)$ | |
| 8 | 2 | $x^{(0)}(i) = d^{(0)}(4i)$ | $M_{symb}^{layer} =$ |
| | | $x^{(1)}(i) = d^{(0)}(4i + 1)$ | $M_{symb}^{(0)}/4 = M_{symb}^{(1)}/4$ |
| | | $x^{(2)}(i) = d^{(0)}(4i + 2)$ | |
| | | $x^{(3)}(i) = d^{(0)}(4i + 3)$ | |
| | | $x^{(4)}(i) = d^{(1)}(4i)$ | |
| | | $x^{(5)}(i) = d^{(1)}(4i + 1)$ | |
| | | $x^{(6)}(i) = d^{(1)}(4i + 2)$ | |
| | | $x^{(7)}(i) = d^{(1)}(4i + 3)$ | |

Figure 22:
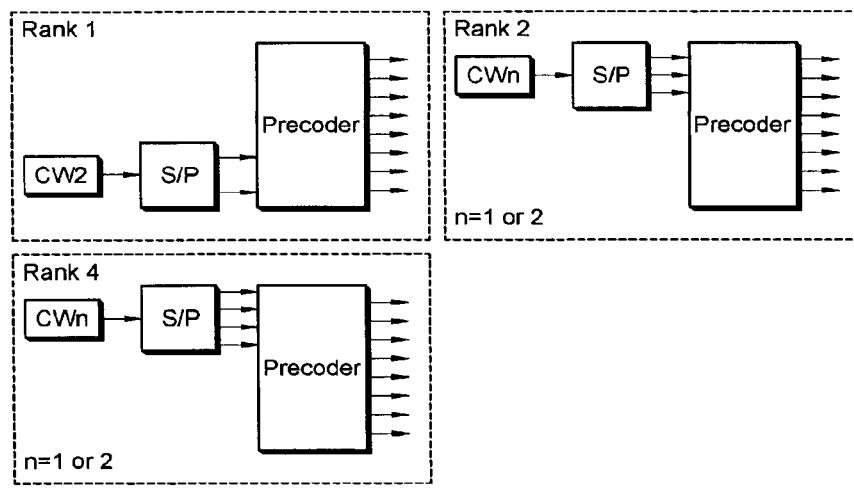
FIG. 22 shows extended mapping when layer mapping is performed according to a 10th embodiment of the present invention.

FIG. 22 shows extended mapping when layer mapping is performed according to the 10th embodiment of the present invention. The extended mapping is used to support HARQ retransmission or rank overriding, and this can be shown by Table 23.

Table 23

TABLE 23

| Number of layers | Number of codewords | Codeword-to-layer mapping, $i = 0, 1, \ldots, M_{symb}^{layer} - 1$ | |
|---|---|---|---|
| 2 | 1 | $x^{(0)}(i) = d^{(1)}(2i)$ | $M_{symb}^{layer} = M_{symb}^{(1)}/2$ |
| | | $x^{(1)}(i) = d^{(1)}(2i + 1)$ | |
| 3 | 1 | $x^{(0)}(i) = d^{(n)}(3i)$ | $M_{symb}^{layer} =$ |
| | | $x^{(1)}(i) = d^{(n)}(3i + 1)$ | $M_{symb}^{(n)}/3, n = 1$ or $2$ |
| | | $x^{(2)}(i) = d^{(n)}(3i + 2)$ | |
| 4 | 1 | $x^{(0)}(i) = d^{(n)}(4i)$ | $M_{symb}^{layer} =$ |
| | | $x^{(1)}(i) = d^{(n)}(4i + 1)$ | $M_{symb}^{(n)}/4, n = 1$ or $2$ |
| | | $x^{(2)}(i) = d^{(n)}(4i + 2)$ | |
| | | $x^{(3)}(i) = d^{(n)}(4i + 3)$ | |

Figure 23:
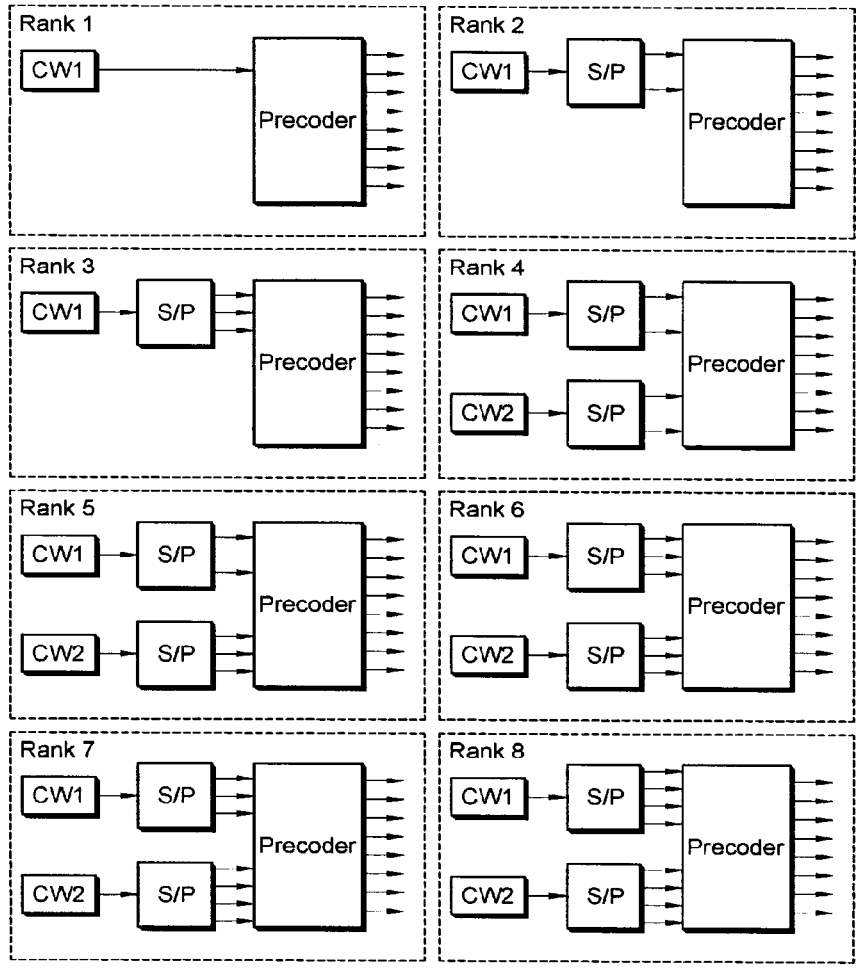
FIG. 23 shows layer mapping according to an 11th embodiment of the present invention.

FIG. 23 shows layer mapping according to an 11th embodiment of the present invention. In single codeword transmission at a rank 3 or lower, transmission performance can be improved by increasing a channel coding gain of a codeword. This can be shown by Tables 24 and 25.

Table 24

TABLE 24

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ | $M_{symb}^{layer} = M_{symb}^{(0)}/2$ |
| | | $x^{(1)}(i) = d^{(0)}(2i + 1)$ | |
| 3 | 1 | $x^{(0)}(i) = d^{(0)}(3i)$ | $M_{symb}^{layer} = M_{symb}^{(0)}/3$ |
| | | $x^{(1)}(i) = d^{(0)}(3i + 1)$ | |
| | | $x^{(2)}(i) = d^{(0)}(3i + 2)$ | |
| 4 | 2 | $x^{(0)}(i) = d^{(0)}(2i)$ | $M_{symb}^{layer} =$ |
| | | $x^{(1)}(i) = d^{(0)}(2i + 1)$ | $M_{symb}^{(0)}/2 = M_{symb}^{(1)}/2$ |

TABLE 24-continued

| Number of layers | Number of codewords | Codeword-to-layer mapping, $i = 0, 1, \ldots, M_{symb}^{layer} - 1$ | |
|---|---|---|---|
| | | $x^{(2)}(i) = d^{(1)}(2i)$ | |
| | | $x^{(3)}(i) = d^{(1)}(2i + 1)$ | |
| 5 | 2 | $x^{(0)}(i) = d^{(0)}(2i)$ | $M_{symb}^{layer} =$ |
| | | $x^{(1)}(i) = d^{(0)}(2i + 1)$ | $M_{symb}^{(0)}/2 = M_{symb}^{(1)}/3$ |
| | | $x^{(2)}(i) = d^{(1)}(3i)$ | |
| | | $x^{(3)}(i) = d^{(1)}(3i + 1)$ | |
| | | $x^{(4)}(i) = d^{(1)}(3i + 2)$ | |
| 6 | 2 | $x^{(0)}(i) = d^{(0)}(3i)$ | $M_{symb}^{layer} =$ |
| | | $x^{(1)}(i) = d^{(0)}(3i + 1)$ | $M_{symb}^{(0)}/3 = M_{symb}^{(1)}/3$ |
| | | $x^{(2)}(i) = d^{(0)}(3i + 2)$ | |
| | | $x^{(3)}(i) = d^{(1)}(3i)$ | |
| | | $x^{(4)}(i) = d^{(1)}(3i + 1)$ | |
| | | $x^{(5)}(i) = d^{(1)}(3i + 2)$ | |

Table 25

TABLE 25

| Number of layers | Number of codewords | Codeword-to-layer mapping, $i = 0, 1, \ldots, M_{symb}^{layer} - 1$ | |
|---|---|---|---|
| 7 | 2 | $x^{(0)}(i) = d^{(0)}(3i)$ | $M_{symb}^{layer} =$ |
| | | $x^{(1)}(i) = d^{(0)}(3i + 1)$ | $M_{symb}^{(0)}/3 = M_{symb}^{(1)}/4$ |
| | | $x^{(2)}(i) = d^{(0)}(3i + 2)$ | |
| | | $x^{(3)}(i) = d^{(1)}(4i)$ | |
| | | $x^{(4)}(i) = d^{(1)}(4i + 1)$ | |
| | | $x^{(5)}(i) = d^{(1)}(4i + 2)$ | |
| | | $x^{(6)}(i) = d^{(1)}(4i + 3)$ | |
| 8 | 2 | $x^{(0)}(i) = d^{(0)}(4i)$ | $M_{symb}^{layer} =$ |
| | | $x^{(1)}(i) = d^{(0)}(4i + 1)$ | $M_{symb}^{(0)}/4 = M_{symb}^{(1)}/4$ |
| | | $x^{(2)}(i) = d^{(0)}(4i + 2)$ | |
| | | $x^{(3)}(i) = d^{(0)}(4i + 3)$ | |
| | | $x^{(4)}(i) = d^{(1)}(4i)$ | |
| | | $x^{(5)}(i) = d^{(1)}(4i + 1)$ | |
| | | $x^{(6)}(i) = d^{(1)}(4i + 2)$ | |
| | | $x^{(7)}(i) = d^{(1)}(4i + 3)$ | |

Figure 24:
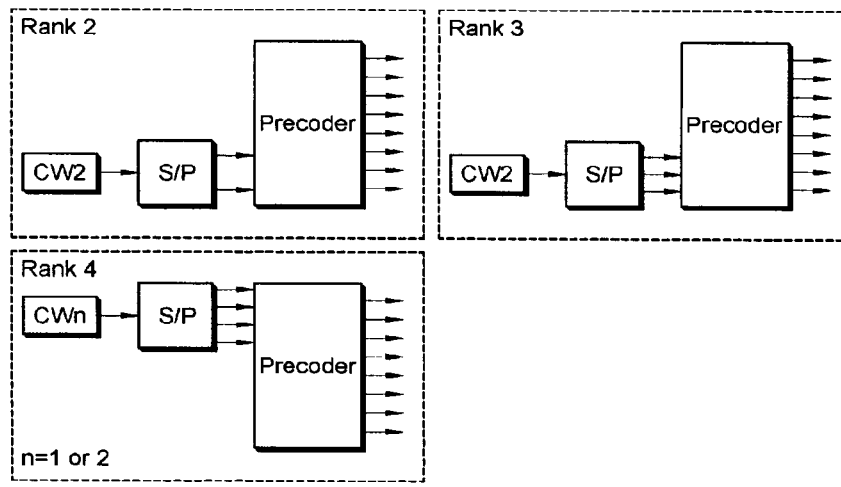
FIG. 24 shows extended mapping when layer mapping is performed according to an 11th embodiment of the present invention.

FIG. 24 shows extended mapping when layer mapping is performed according to the 11th embodiment of the present invention. The extended mapping is used to support HARQ retransmission or rank overriding, and this can be shown by Table 26.

Table 26

TABLE 26

| Number of layers | Number of codewords | Codeword-to-layer mapping, $i = 0, 1, \ldots, M_{symb}^{layer} - 1$ | |
|---|---|---|---|
| 2 | 1 | $x^{(0)}(i) = d^{(1)}(2i)$ | $M_{symb}^{layer} = M_{symb}^{(1)}/2$ |
| | | $x^{(1)}(i) = d^{(1)}(2i + 1)$ | |
| 3 | 1 | $x^{(0)}(i) = d^{(1)}(3i)$ | $M_{symb}^{layer} = M_{symb}^{(1)}/3$ |
| | | $x^{(1)}(i) = d^{(1)}(3i + 1)$ | |
| | | $x^{(2)}(i) = d^{(1)}(3i + 2)$ | |
| 4 | 1 | $x^{(0)}(i) = d^{(n)}(4i)$ | $M_{symb}^{layer} =$ |
| | | $x^{(1)}(i) = d^{(n)}(4i + 1)$ | $M_{symb}^{(n)}/4, n = 1$ or $2$ |
| | | $x^{(2)}(i) = d^{(n)}(4i + 2)$ | |
| | | $x^{(3)}(i) = d^{(n)}(4i + 3)$ | |

Figure 25:
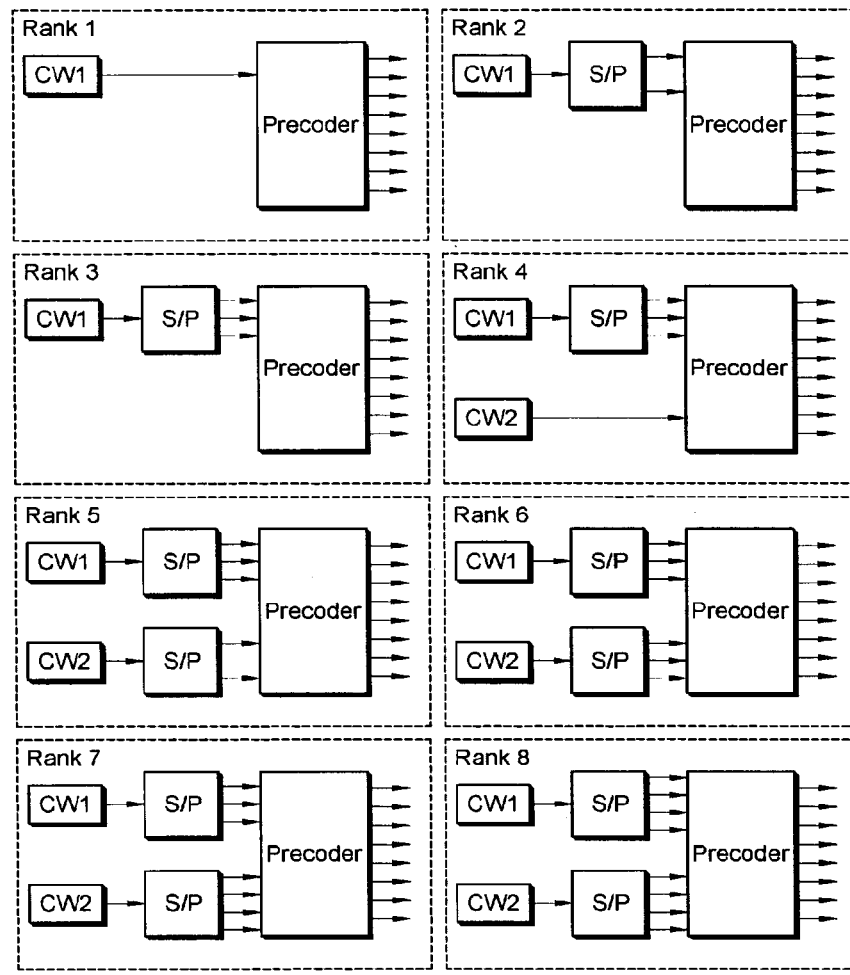
FIG. 25 shows layer mapping according to a 12th embodiment of the present invention.

FIG. 25 shows layer mapping according to a 12th embodiment of the present invention. Only a single codeword is transmitted at a rank 3 or lower. A change in an aspect of mapping each codeword to layers at different ranks is minimized. In transmission using active rank adaptation, disparity between the MCS used in transmission and the CQI reported by the UE depending on the rank change can be minimized. This can be shown by Tables 27 and 28.

Table 27

TABLE 27

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 3 | 1 | $x^{(0)}(i) = d^{(0)}(3i)$<br>$x^{(1)}(i) = d^{(0)}(3i + 1)$<br>$x^{(2)}(i) = d^{(0)}(3i + 2)$ | $M_{symb}^{layer} = M_{symb}^{(0)}/3$ |
| 4 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(i)$ | $M_{symb}^{layer} = M_{symb}^{(0)}/3 = M_{symb}^{(1)}$ |
| 5 | 2 | $x^{(0)}(i) = d^{(0)}(2i)$<br>$x^{(1)}(i) = d^{(0)}(2i + 1)$<br>$x^{(2)}(i) = d^{(1)}(3i)$<br>$x^{(3)}(i) = d^{(1)}(3i + 1)$<br>$x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(3i)$<br>$x^{(4)}(i) = d^{(1)}(3i + 1)$<br>$x^{(5)}(i) = d^{(1)}(3i + 2)$ | $M_{symb}^{layer} = M_{symb}^{(0)}/3 = M_{symb}^{(1)}/3$ |

Table 28

TABLE 28

| Number of layers | Number of codewords | Codeword-to-layer mapping, $i = 0, 1, \ldots, M_{symb}^{layer} - 1$ | |
|---|---|---|---|
| 7 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(4i)$<br>$x^{(4)}(i) = d^{(1)}(4i + 1)$<br>$x^{(5)}(i) = d^{(1)}(4i + 2)$<br>$x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(4i)$<br>$x^{(5)}(i) = d^{(1)}(4i + 1)$<br>$x^{(6)}(i) = d^{(1)}(4i + 2)$<br>$x^{(7)}(i) = d^{(1)}(4i + 3)$ | $M_{symb}^{layer} = M_{symb}^{(0)}/4 = M_{symb}^{(1)}/4$ |

Figure 26:
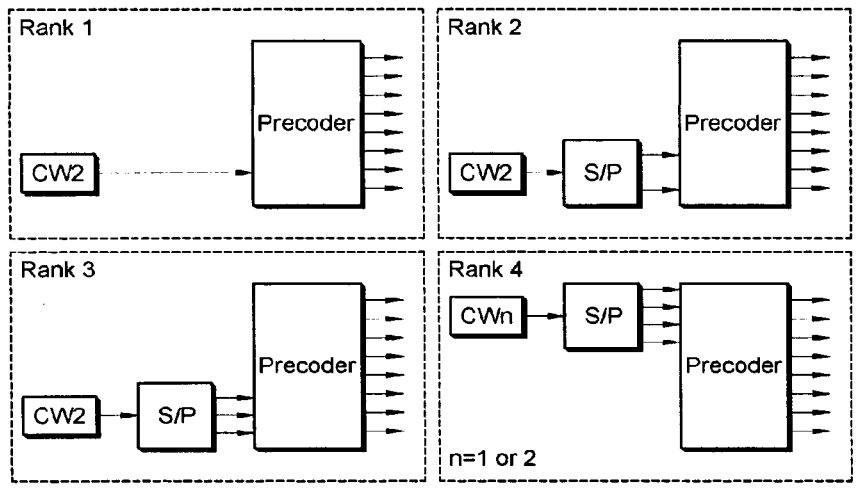
FIG. 26 shows extended mapping in layer mapping according to a 12th embodiment of the present invention.

FIG. 26 shows extended mapping in layer mapping according to the 12th embodiment of the present invention. The extended mapping is used to support HARQ retransmission or rank overriding, and this can be shown by Table 29.

Table 29

TABLE 29

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(1)}(i)$ | $M_{symb}^{layer} = M_{symb}^{(1)}$ |
| 2 | 1 | $x^{(0)}(i) = d^{(1)}(2i)$<br>$x^{(1)}(i) = d^{(1)}(2i + 1)$ | $M_{symb}^{layer} = M_{symb}^{(1)}/2$ |
| 3 | 1 | $x^{(0)}(i) = d^{(1)}(3i)$<br>$x^{(1)}(i) = d^{(1)}(3i + 1)$<br>$x^{(2)}(i) = d^{(1)}(3i + 2)$ | $M_{symb}^{layer} = M_{symb}^{(1)}/3$ |
| 4 | 1 | $x^{(0)}(i) = d^{(n)}(4i)$<br>$x^{(1)}(i) = d^{(n)}(4i + 1)$<br>$x^{(2)}(i) = d^{(n)}(4i + 2)$<br>$x^{(3)}(i) = d^{(n)}(4i + 3)$ | $M_{symb}^{layer} = M_{symb}^{(n)}/4, n = 1$ or 2 |

Figure 27:
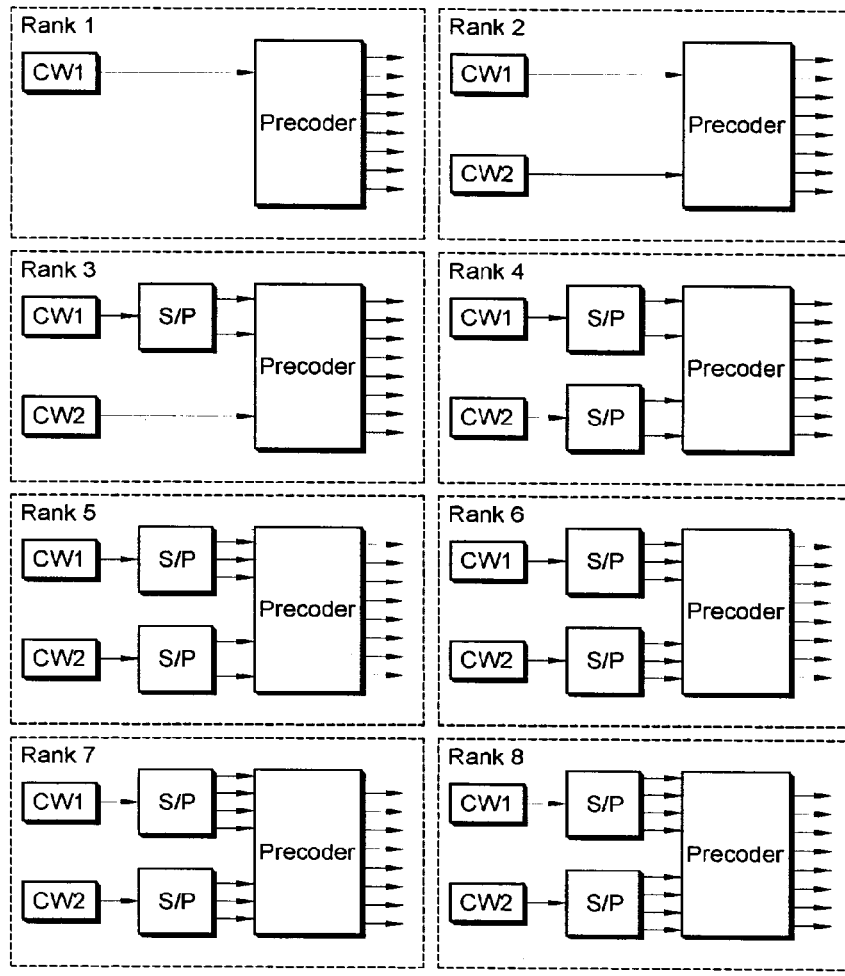
FIG. 27 shows layer mapping according to a 13th embodiment of the present invention.

FIG. 27 shows layer mapping according to a 13th embodiment of the present invention. When the receiver performs the SIC, layer mapping on each codeword is naturally increased according to a codeword index along with the increase of the ranks while codeword symbols mapped to each layer are equalized as mush as possible, thereby optimizing codeword decoding performance. This can be shown by Tables 30 and 31.

Table 30

TABLE 30

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$<br>$x^{(1)}(i) = d^{(1)}(i)$ | $M_{symb}^{layer} = M_{symb}^{(0)} = M_{symb}^{(1)}$ |
| 3 | 2 | $x^{(0)}(i) = d^{(0)}(2i)$<br>$x^{(1)}(i) = d^{(0)}(2i + 1)$<br>$x^{(2)}(i) = d^{(1)}(i)$ | $M_{symb}^{layer} = M_{symb}^{(0)}/2 = M_{symb}^{(1)}$ |
| 4 | 2 | $x^{(0)}(i) = d^{(0)}(2i)$<br>$x^{(1)}(i) = d^{(0)}(2i + 1)$<br>$x^{(2)}(i) = d^{(1)}(2i)$<br>$x^{(3)}(i) = d^{(1)}(2i + 1)$ | $M_{symb}^{layer} = M_{symb}^{(0)}/2 = M_{symb}^{(1)}/2$ |
| 5 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(2i)$<br>$x^{(4)}(i) = d^{(1)}(2i + 1)$ | $M_{symb}^{layer} = M_{symb}^{(0)}/3 = M_{symb}^{(1)}/2$ |
| 6 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(3i)$<br>$x^{(4)}(i) = d^{(1)}(3i + 1)$<br>$x^{(5)}(i) = d^{(1)}(3i + 2)$ | $M_{symb}^{layer} = M_{symb}^{(0)}/3 = M_{symb}^{(1)}/3$ |

Table 31

TABLE 31

| Number of layers | Number of codewords | Codeword-to-layer mapping, $i = 0, 1, \ldots, M_{symb}^{layer} - 1$ | |
|---|---|---|---|
| 7 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(3i)$<br>$x^{(5)}(i) = d^{(1)}(3i + 1)$<br>$x^{(6)}(i) = d^{(1)}(3i + 2)$ | $M_{symb}^{layer} = M_{symb}^{(0)}/4 = M_{symb}^{(1)}/3$ |
| 8 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(4i)$<br>$x^{(5)}(i) = d^{(1)}(4i + 1)$<br>$x^{(6)}(i) = d^{(1)}(4i + 2)$<br>$x^{(7)}(i) = d^{(1)}(4i + 3)$ | $M_{symb}^{layer} = M_{symb}^{(0)}/4 = M_{symb}^{(1)}/4$ |

Figure 28:
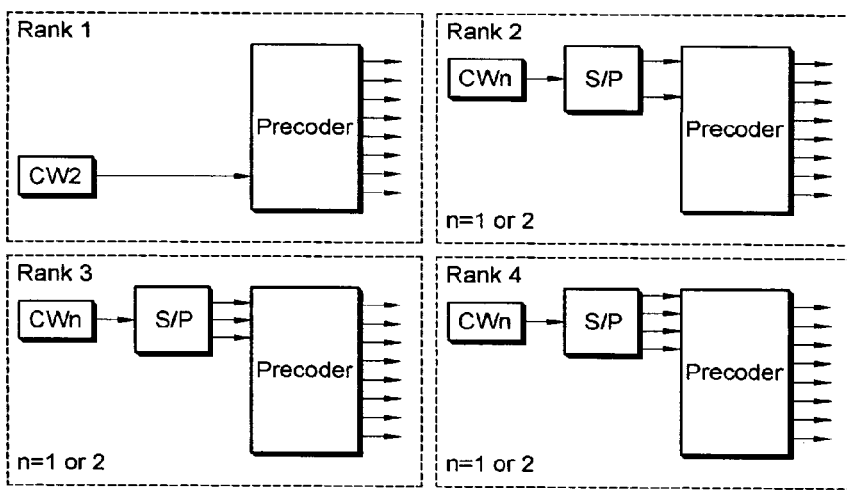
FIG. 28 shows extended mapping when layer mapping is performed according to a 13th embodiment of the present invention.

FIG. 28 shows extended mapping when layer mapping is performed according to the 13th embodiment of the present invention. The extended mapping is used to support HARQ retransmission or rank overriding, and this can be shown by Table 32.

Table 32

TABLE 32

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(1)}(i)$ | $M_{symb}^{layer} = M_{symb}^{(1)}$ |
| 2 | 1 | $x^{(0)}(i) = d^{(n)}(2i)$<br>$x^{(1)}(i) = d^{(n)}(2i + 1)$ | $M_{symb}^{layer} = M_{symb}^{(n)}/2, n = 1$ or 2 |

TABLE 32-continued

| Number of layers | Number of codewords | Codeword-to-layer mapping, $i = 0, 1, \ldots, M_{symb}^{layer} - 1$ | |
|---|---|---|---|
| 3 | 1 | $x^{(0)}(i) = d^{(n)}(3i)$ $x^{(1)}(i) = d^{(n)}(3i + 1)$ $x^{(2)}(i) = d^{(n)}(3i + 2)$ | $M_{symb}^{layer} = M_{symb}^{(n)}/3$, n = 1 or 2 |
| 4 | 1 | $x^{(0)}(i) = d^{(n)}(4i)$ $x^{(1)}(i) = d^{(n)}(4i + 1)$ $x^{(2)}(i) = d^{(n)}(4i + 2)$ $x^{(3)}(i) = d^{(n)}(4i + 3)$ | $M_{symb}^{layer} = M_{symb}^{(n)}/4$, n = 1 or 2 |

Figure 29:
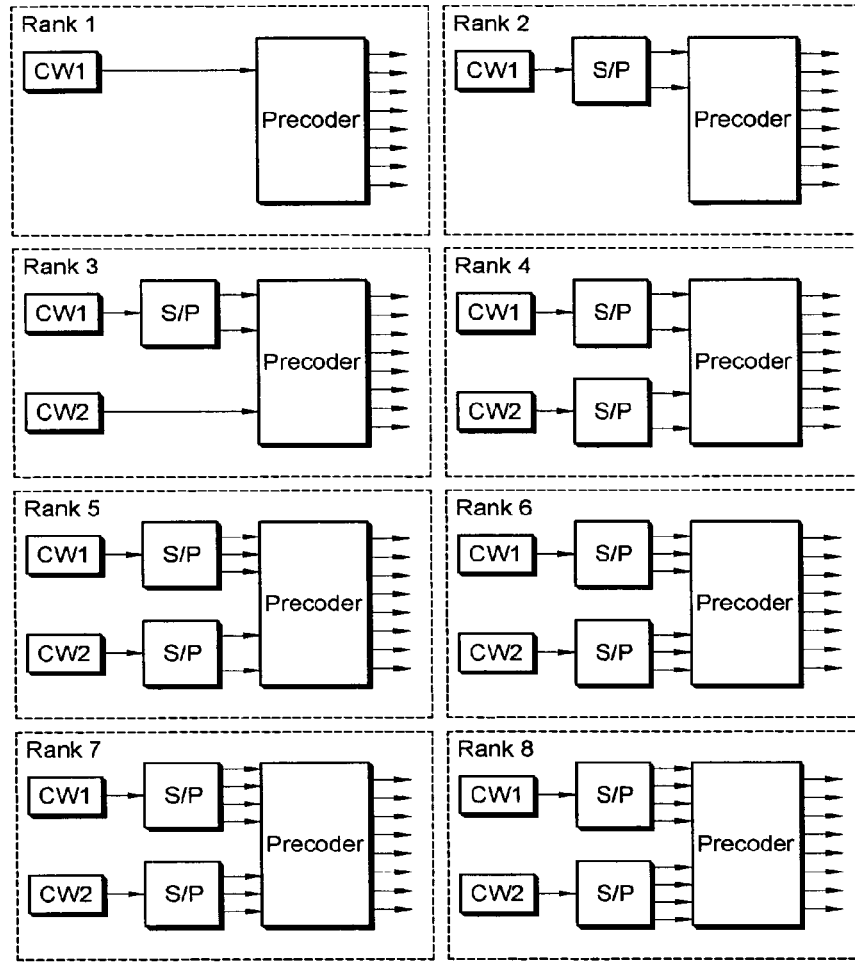
FIG. 29 shows layer mapping according to a 14th embodiment of the present invention.

FIG. 29 shows layer mapping according to a 14th embodiment of the present invention. Only a single codeword is transmitted for a rank 2 or lower by basically using the layer mapping according to the 13th embodiment. Thus, when the SCI gain of the receiver is small, transmission performance can be improved by increasing a channel coding gain of the single codeword. This can be shown by Tables 33 and 34.

Table 33

TABLE 33

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 3 | 2 | $x^{(0)}(i) = d^{(0)}(2i)$ $x^{(1)}(i) = d^{(0)}(2i + 1)$ $x^{(2)}(i) = d^{(1)}(i)$ | $M_{symb}^{layer} = M_{symb}^{(0)}/2 = M_{symb}^{(1)}$ |
| 4 | 2 | $x^{(0)}(i) = d^{(0)}(2i)$ $x^{(1)}(i) = d^{(0)}(2i + 1)$ $x^{(2)}(i) = d^{(1)}(2i)$ $x^{(3)}(i) = d^{(1)}(2i + 1)$ | $M_{symb}^{layer} = M_{symb}^{(0)}/2 = M_{symb}^{(1)}/2$ |
| 5 | 2 | $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(2i)$ $x^{(4)}(i) = d^{(1)}(2i + 1)$ | $M_{symb}^{layer} = M_{symb}^{(0)}/3 = M_{symb}^{(1)}/2$ |
| 6 | 2 | $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(3i)$ $x^{(4)}(i) = d^{(1)}(3i + 1)$ $x^{(5)}(i) = d^{(1)}(3i + 2)$ | $M_{symb}^{layer} = M_{symb}^{(0)}/3 = M_{symb}^{(1)}/3$ |

Table 34

TABLE 34

| Number of layers | Number of codewords | Codeword-to-layer mapping, $i = 0, 1, \ldots, M_{symb}^{layer} - 1$ | |
|---|---|---|---|
| 7 | 2 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ $x^{(4)}(i) = d^{(1)}(3i)$ $x^{(5)}(i) = d^{(1)}(3i + 1)$ $x^{(6)}(i) = d^{(1)}(3i + 2)$ | $M_{symb}^{layer} = M_{symb}^{(0)}/4 = M_{symb}^{(1)}/3$ |
| 8 | 2 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ $x^{(4)}(i) = d^{(1)}(4i)$ $x^{(5)}(i) = d^{(1)}(4i + 1)$ $x^{(6)}(i) = d^{(1)}(4i + 2)$ $x^{(7)}(i) = d^{(1)}(4i + 3)$ | $M_{symb}^{layer} = M_{symb}^{(0)}/4 = M_{symb}^{(1)}/4$ |

Figure 30:
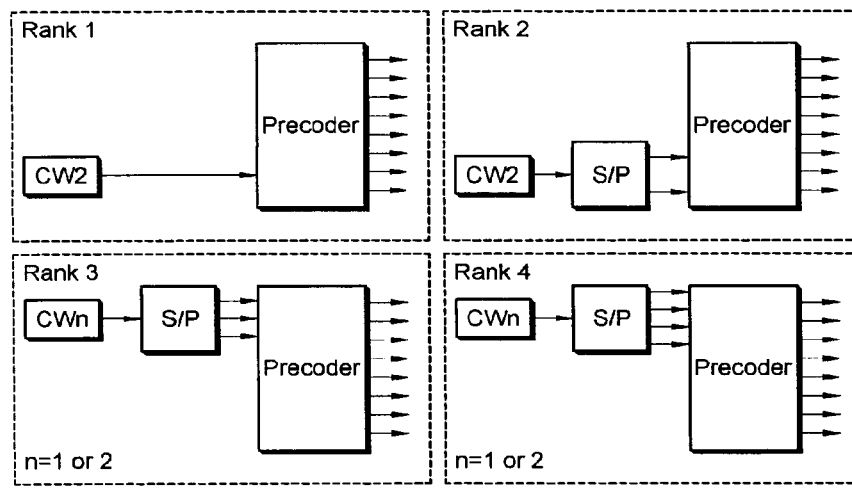
FIG. 30 shows extended mapping when layer mapping is performed according to a 14th embodiment of the present invention.

FIG. 30 shows extended mapping when layer mapping is performed according to the 14th embodiment of the present invention. The extended mapping is used to support HARQ retransmission or rank overriding, and this can be shown by Table 35.

Table 35

TABLE 35

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(1)}(i)$ | $M_{symb}^{layer} = M_{symb}^{(1)}$ |
| 2 | 1 | $x^{(0)}(i) = d^{(1)}(2i)$ $x^{(1)}(i) = d^{(1)}(2i + 1)$ | $M_{symb}^{layer} = M_{symb}^{(1)}/2$ |
| 3 | 1 | $x^{(0)}(i) = d^{(n)}(3i)$ $x^{(1)}(i) = d^{(n)}(3i + 1)$ $x^{(2)}(i) = d^{(n)}(3i + 2)$ | $M_{symb}^{layer} = M_{symb}^{(n)}/3$, n = 1 or 2 |
| 4 | 1 | $x^{(0)}(i) = d^{(n)}(4i)$ $x^{(1)}(i) = d^{(n)}(4i + 1)$ $x^{(2)}(i) = d^{(n)}(4i + 2)$ $x^{(3)}(i) = d^{(n)}(4i + 3)$ | $M_{symb}^{layer} = M_{symb}^{(n)}/4$, n = 1 or 2 |

Figure 31:
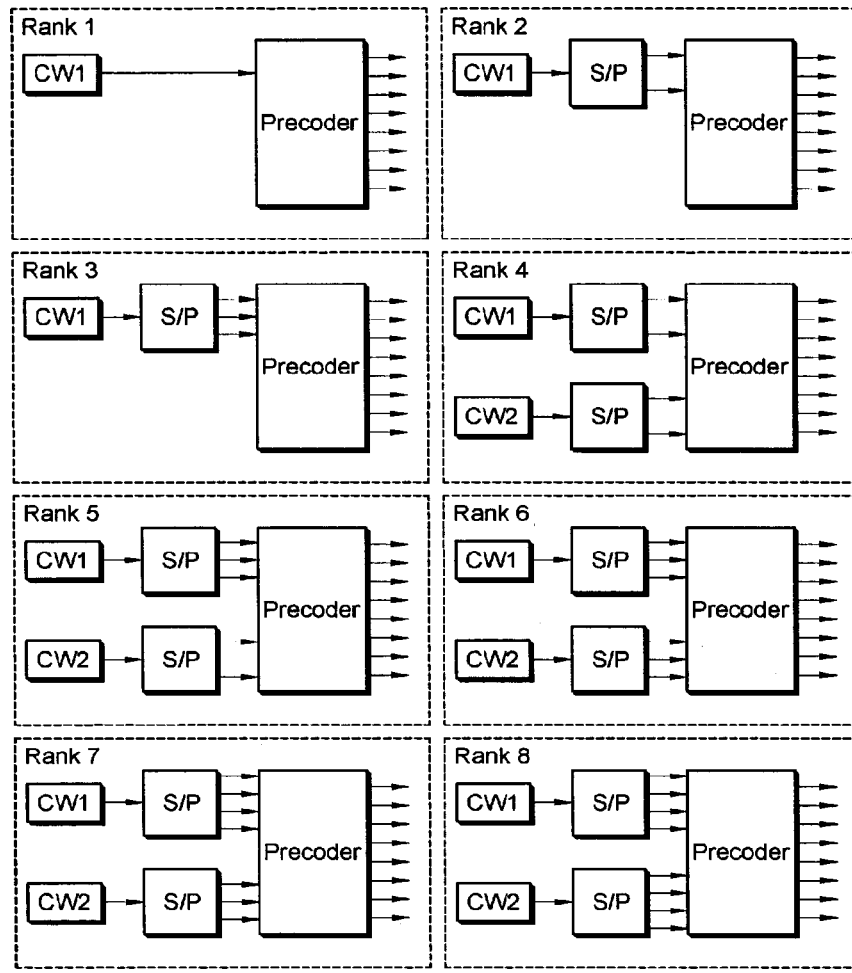
FIG. 31 shows layer mapping according to a 15th embodiment of the present invention.

FIG. 31 shows layer mapping according to a 15th embodiment of the present invention. Only a single codeword is transmitted for a rank 3 or lower by basically using the layer mapping according to the 13th embodiment. Thus, when the SCI gain of the receiver is small, transmission performance can be improved by increasing a channel coding gain of the single codeword. This can be shown by Tables 36 and 37.

Table 36

TABLE 36

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 3 | 1 | $x^{(0)}(i) = d^{(0)}(3i)$ $x^{(1)}(i) = d^{(0)}(3i + 1)$ $x^{(2)}(i) = d^{(0)}(3i + 2)$ | $M_{symb}^{layer} = M_{symb}^{(0)}/3$ |
| 4 | 2 | $x^{(0)}(i) = d^{(0)}(2i)$ $x^{(1)}(i) = d^{(0)}(2i + 1)$ $x^{(2)}(i) = d^{(1)}(2i)$ $x^{(3)}(i) = d^{(1)}(2i + 1)$ | $M_{symb}^{layer} = M_{symb}^{(0)}/2 = M_{symb}^{(1)}/2$ |
| 5 | 2 | $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(2i)$ $x^{(4)}(i) = d^{(1)}(2i + 1)$ | $M_{symb}^{layer} = M_{symb}^{(0)}/3 = M_{symb}^{(1)}/2$ |
| 6 | 2 | $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(3i)$ $x^{(4)}(i) = d^{(1)}(3i + 1)$ $x^{(5)}(i) = d^{(1)}(3i + 2)$ | $M_{symb}^{layer} = M_{symb}^{(0)}/3 = M_{symb}^{(1)}/3$ |

Table 37

TABLE 37

| Number of layers | Number of codewords | Codeword-to-layer mapping, $i = 0, 1, \ldots, M_{symb}^{layer} - 1$ | |
|---|---|---|---|
| 7 | 2 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ $x^{(4)}(i) = d^{(1)}(3i)$ $x^{(5)}(i) = d^{(1)}(3i + 1)$ $x^{(6)}(i) = d^{(1)}(3i + 2)$ | $M_{symb}^{layer} = M_{symb}^{(0)}/4 = M_{symb}^{(1)}/3$ |
| 8 | 2 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ $x^{(4)}(i) = d^{(1)}(4i)$ | $M_{symb}^{layer} = M_{symb}^{(0)}/4 = M_{symb}^{(1)}/4$ |

TABLE 37-continued

| Number of layers | Number of codewords | Codeword-to-layer mapping, $i = 0, 1, \ldots, M_{symb}^{layer} - 1$ |
|---|---|---|
| | | $x^{(5)}(i) = d^{(1)}(4i + 1)$ |
| | | $x^{(6)}(i) = d^{(1)}(4i + 2)$ |
| | | $x^{(7)}(i) = d^{(1)}(4i + 3)$ |

Figure 32:
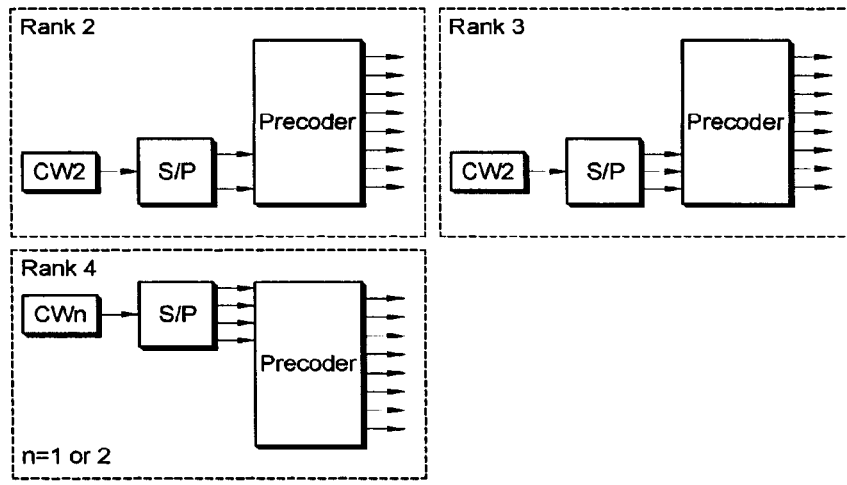
FIG. 32 shows extended mapping when layer mapping is performed according to a 15th embodiment of the present invention.

FIG. 32 shows extended mapping when layer mapping is performed according to the 15th embodiment of the present invention. The extended mapping is used to support HARQ retransmission or rank overriding, and this can be shown by Table 38.

Table 38

TABLE 38

| Number of layers | Number of codewords | Codeword-to-layer mapping, $i = 0, 1, \ldots, M_{symb}^{layer} - 1$ | |
|---|---|---|---|
| 2 | 1 | $x^{(0)}(i) = d^{(1)}(2i)$<br>$x^{(1)}(i) = d^{(1)}(2i + 1)$ | $M_{symb}^{layer} = M_{symb}^{(1)}/2$ |
| 3 | 1 | $x^{(0)}(i) = d^{(1)}(3i)$<br>$x^{(1)}(i) = d^{(1)}(3i + 1)$<br>$x^{(2)}(i) = d^{(1)}(3i + 2)$ | $M_{symb}^{layer} = M_{symb}^{(1)}/3$ |
| 4 | 1 | $x^{(0)}(i) = d^{(n)}(4i)$<br>$x^{(1)}(i) = d^{(n)}(4i + 1)$<br>$x^{(2)}(i) = d^{(n)}(4i + 2)$<br>$x^{(3)}(i) = d^{(n)}(4i + 3)$ | $M_{symb}^{layer} = M_{symb}^{(n)}/4$, n = 1 or 2 |

Figure 33:
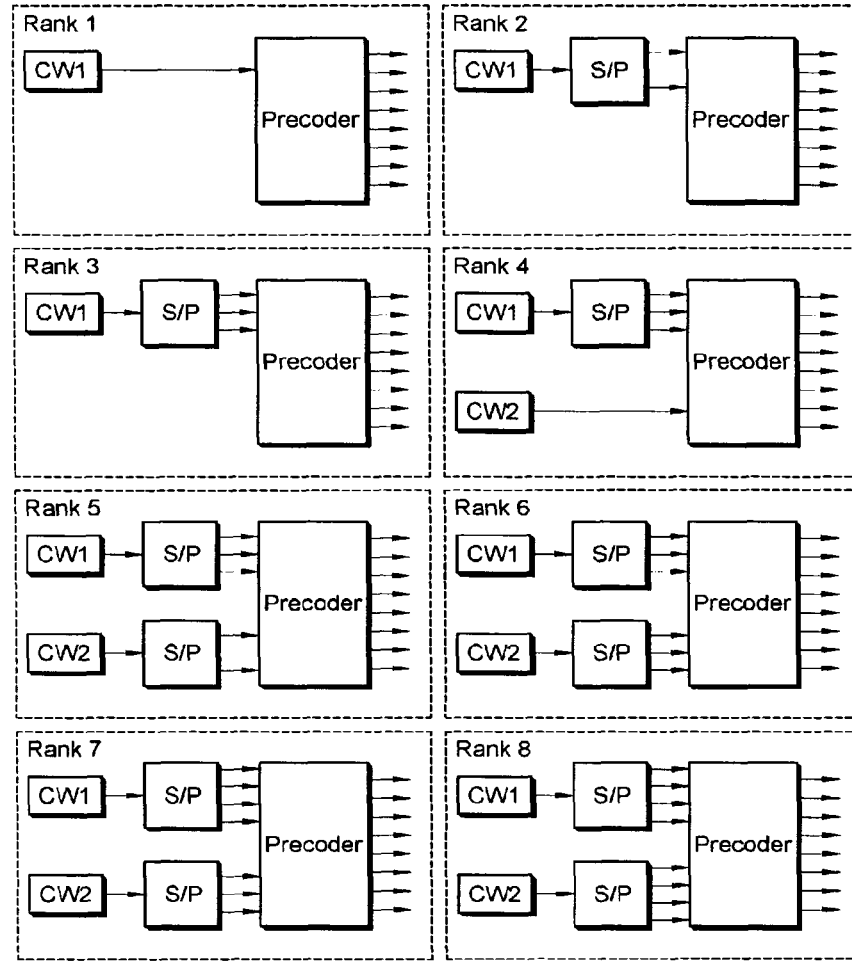
FIG. 33 shows layer mapping according to a 16th embodiment of the present invention.

FIG. 33 shows layer mapping according to a 16th embodiment of the present invention. Only a single codeword is transmitted for a rank 3 or lower by basically using the layer mapping according to the 13th embodiment.

A change in an aspect of mapping each codeword to layers at different ranks is minimized. In transmission using active rank adaptation, disparity between the MCS used in transmission and the CQI reported by the UE depending on the rank change can be minimized. This can be shown by Tables 39 and 40.

Table 39

TABLE 39

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 3 | 1 | $x^{(0)}(i) = d^{(0)}(3i)$<br>$x^{(1)}(i) = d^{(0)}(3i + 1)$<br>$x^{(2)}(i) = d^{(0)}(3i + 2)$ | $M_{symb}^{layer} = M_{symb}^{(0)}/3$ |
| 4 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(i)$ | $M_{symb}^{layer} = M_{symb}^{(0)}/3 = M_{symb}^{(1)}$ |
| 5 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(2i)$<br>$x^{(4)}(i) = d^{(1)}(2i + 1)$ | $M_{symb}^{layer} = M_{symb}^{(0)}/3 = M_{symb}^{(1)}/2$ |
| 6 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(3i)$<br>$x^{(4)}(i) = d^{(1)}(3i + 1)$<br>$x^{(5)}(i) = d^{(1)}(3i + 2)$ | $M_{symb}^{layer} = M_{symb}^{(0)}/3 = M_{symb}^{(1)}/3$ |

Table 40

TABLE 40

| Number of layers | Number of codewords | Codeword-to-layer mapping, $i = 0, 1, \ldots, M_{symb}^{layer} - 1$ | |
|---|---|---|---|
| 7 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(3i)$<br>$x^{(5)}(i) = d^{(1)}(3i + 1)$<br>$x^{(6)}(i) = d^{(1)}(3i + 2)$ | $M_{symb}^{layer} = M_{symb}^{(0)}/4 = M_{symb}^{(1)}/3$ |
| 8 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(4i)$<br>$x^{(5)}(i) = d^{(1)}(4i + 1)$<br>$x^{(6)}(i) = d^{(1)}(4i + 2)$<br>$x^{(7)}(i) = d^{(1)}(4i + 3)$ | $M_{symb}^{layer} = M_{symb}^{(0)}/4 = M_{symb}^{(1)}/4$ |

Figure 34:
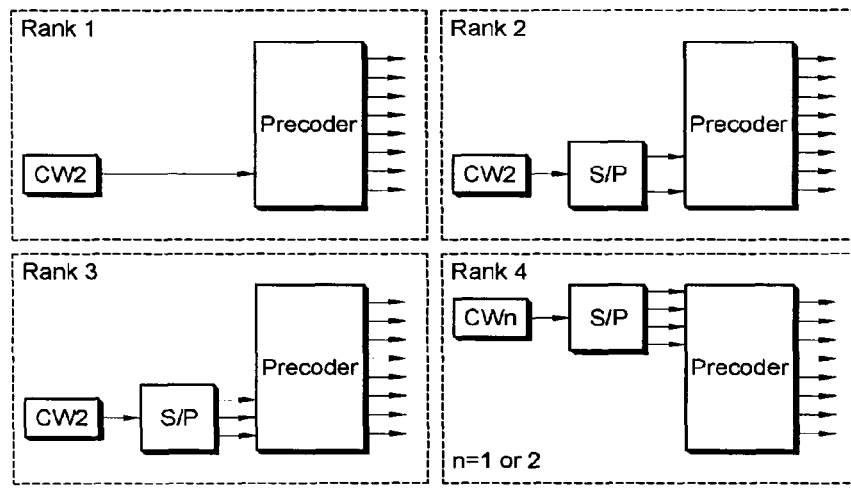
FIG. 34 shows extended mapping when layer mapping is performed according to a 16th embodiment of the present invention.

FIG. 34 shows extended mapping when layer mapping is performed according to the 16th embodiment of the present invention. The extended mapping is used to support HARQ retransmission or rank overriding, and this can be shown by Table 41.

Table 41

TABLE 41

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(1)}(i)$ | $M_{symb}^{layer} = M_{symb}^{(1)}$ |
| 2 | 1 | $x^{(0)}(i) = d^{(1)}(2i)$<br>$x^{(1)}(i) = d^{(1)}(2i + 1)$ | $M_{symb}^{layer} = M_{symb}^{(1)}/2$ |
| 3 | 1 | $x^{(0)}(i) = d^{(1)}(3i)$<br>$x^{(1)}(i) = d^{(1)}(3i + 1)$<br>$x^{(2)}(i) = d^{(1)}(3i + 2)$ | $M_{symb}^{layer} = M_{symb}^{(1)}/3$ |
| 4 | 1 | $x^{(0)}(i) = d^{(n)}(4i)$<br>$x^{(1)}(i) = d^{(n)}(4i + 1)$<br>$x^{(2)}(i) = d^{(n)}(4i + 2)$<br>$x^{(3)}(i) = d^{(n)}(4i + 3)$ | $M_{symb}^{layer} = M_{symb}^{(n)}/4$, n = 1 or 2 |

According to the aforementioned embodiments, layer mapping methods for all possible ranks with respect to 6 antenna ports and 8 antenna ports are introduced for exemplary purposes only. Various modifications can be made therein by those skilled in the art by combining some or all of the mapping methods described in these embodiments.

Extended mapping is a combination of available layers when the number of available layers is decreased in basic layer mapping. If layer mapping which is a basis of the extended mapping is referred to as basic mapping, the number of available layers is decreased for the following reasons. First, HARQ transmission is one of the reasons. Tt is assumed that, in the basic mapping, the first codeword and the second codeword are initially transmitted, and transmission of the first codeword is successful whereas transmission of the second codeword fails. Since it is sufficient to retransmit the second codeword, the extended mapping is defined for the retransmission of the second codeword. Second, rank overriding or restriction is one of the reasons. Although the basis mapping is used between the BS and the UE, if necessary, the BS may use only some ranks or some parts of a precoding matrix index (PMI). As the number of layers is decreased, there is a need to define the extended mapping.

Figure 35:
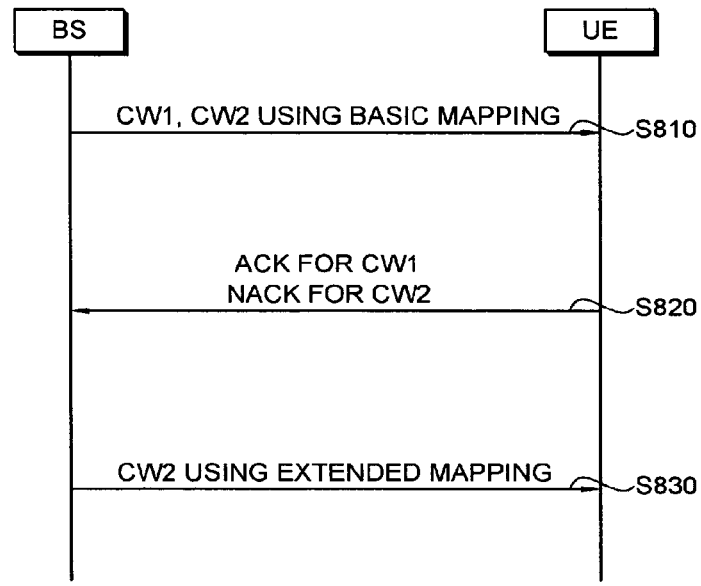
FIG. 35 is a flow diagram showing triggering from basic mapping to extended mapping by hybrid automatic repeat request (HARQ) retransmission.

FIG. 35 is a flow diagram showing triggering from basic mapping to extended mapping by HARQ retransmission. In step S810, a BS transmits a first codeword CW1 and a second codeword CW2 to a UE by using basic mapping. For example, the basic mapping may be performed when a rank is 2 in the embodiment of FIG. 3. The BS may report control information for decoding of the first codeword CW1 and the second codeword CW2, e.g., an MCS index of the first codeword CW1 and an MCS index of the second codeword CW2, to the UE.

In step S820, since no error is detected from the first codeword CW1, and an error is detected from the second codeword CW2, thus the UE transmits an acknowledgement (ACK) signal for the first codeword CW1, and transmits a negative-ACK (NACK) signal for the second codeword CW2.

In step S803, the BS retransmits the second codeword CW2 by using the extended mapping. For example, the extended mapping may be performed when a rank is 1 in the embodiment of FIG. 4 which is extended mapping for layer mapping of the embodiment of FIG. 3. To indicate the extended mapping, triggering to the extended mapping may be indicated by using a triggering indicator. Some parts of the re-transmitted control information for decoding of the second codeword CW2 may be set to a specific value. For example, when the MCS index is set to the specific value, the UE can confirm that the extended mapping is used in transmission.

Although downlink HARQ is exemplified, the present invention is not limited thereto. Thus, the present invention may also apply to uplink HARQ in which the UE transmits uplink data and in which the BS requests retransmission.

Figure 36:
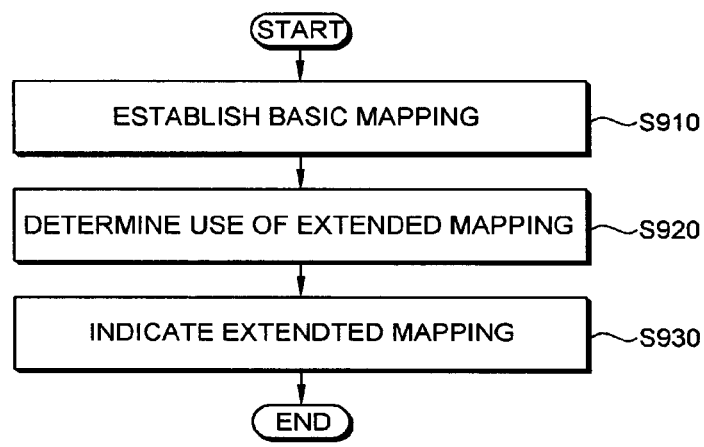
FIG. 36 is a flowchart showing triggering from basic mapping to extended mapping.

FIG. 36 is a flowchart showing triggering from basic mapping to extended mapping. In step S910, the basic mapping is established between a BS and a UE. The basic mapping is a basic layer mapping scheme for transmitting and/or receiving data between the BS and the UE. In step S920, the BS determines whether the extended mapping is used. The extended mapping may be used when the UE is instructed to report a channel condition for a restricted rank. Alternatively, the extended mapping may be used for HARQ transmission. The extended mapping may also be used when layer mapping is performed for downlink data in a state that the rank reported by the UE is overridden. In step S930, the BS instructs the use of extended mapping. The BS reports the use of extended mapping to the UE so that the UE is ready to perform an operation based on the extended mapping.

Figure 37:
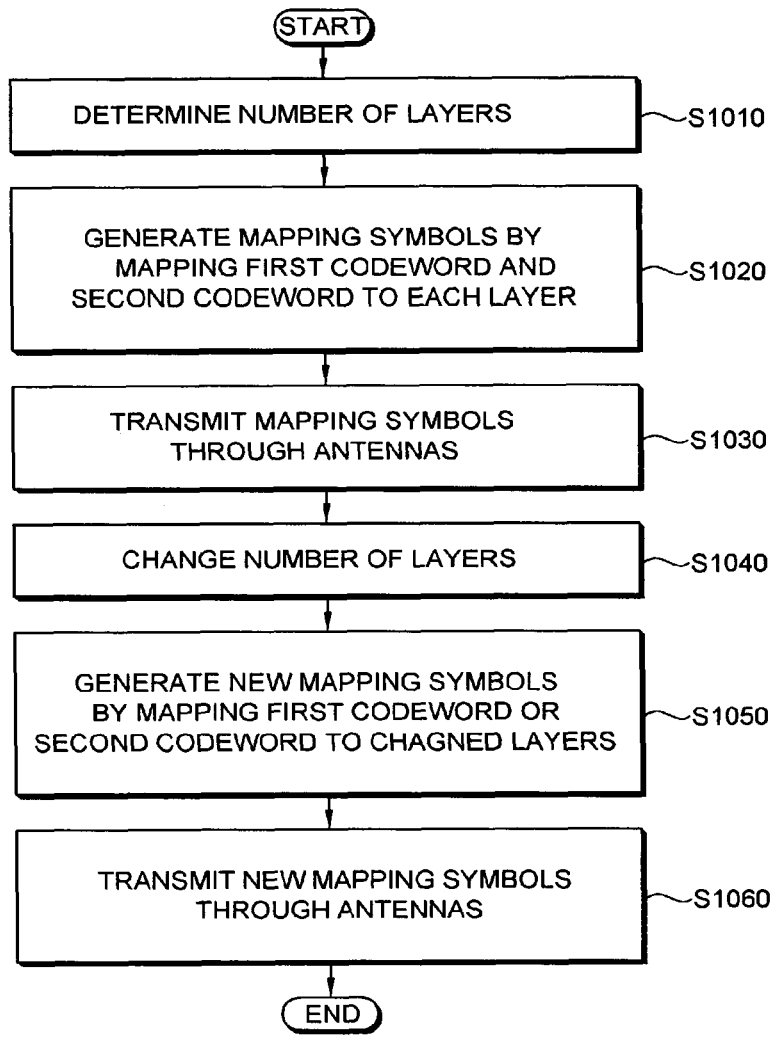
FIG. 37 is a flowchart showing a method of data transmission according to an embodiment of the present invention.

FIG. 37 is a flowchart showing a method of data transmission according to an embodiment of the present invention. This method may be carried in a BS at downlink transmission or in a UE at uplink transmission.

In step S1010, the number of layers is determined. In step S1020, mapping symbols are generated by mapping modulation symbols for a first codeword and modulation symbols for a second codeword to each layer. At least one of the first codeword and the second codeword may be mapped to 3 layers and the number of layers may be larger than 3. Layer mapping schemes shown in FIGS. 3-34 may be used. In step S1030, the mapping symbols are transmitted through a plurality of antennas.

The number of layers may be changed in order to perform HARQ or rank overriding. In step S1040, the number of layers is changed. The number of layers after changed may be smaller than the number of layers before changed. In step S1050, new mapping symbols is generated by mapping the modulation symbols for the first codeword or the mapping modulation symbols for the second codeword to each layer. Layer mapping schemes shown in FIGS. 3-34 may be used.

In step S1060, the new mapping symbols are transmitted through the plurality of antennas.

Figure 38:
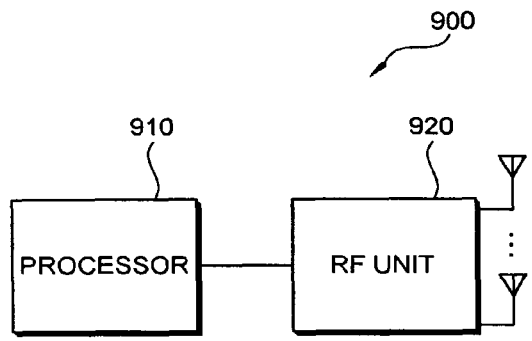
FIG. 38 is a block diagram showing a transmitter according to an embodiment of the present invention.

FIG. 38 is a block diagram showing a transmitter according to an embodiment of the present invention. A transmitter 900 includes a processor 910 and a radio frequency (RF) unit 920. The processor 910 may implements at least one embodiment among embodiments shown in FIGS. 3-37. The RF unit 920 is connected to the processor 910 to transmit and/or receive radio signals through multiple Tx antennas. In uplink, the transmitter 900 may be a part of a UE. In downlink, the transmitter 900 may be a part of a BS.

Figure 39:
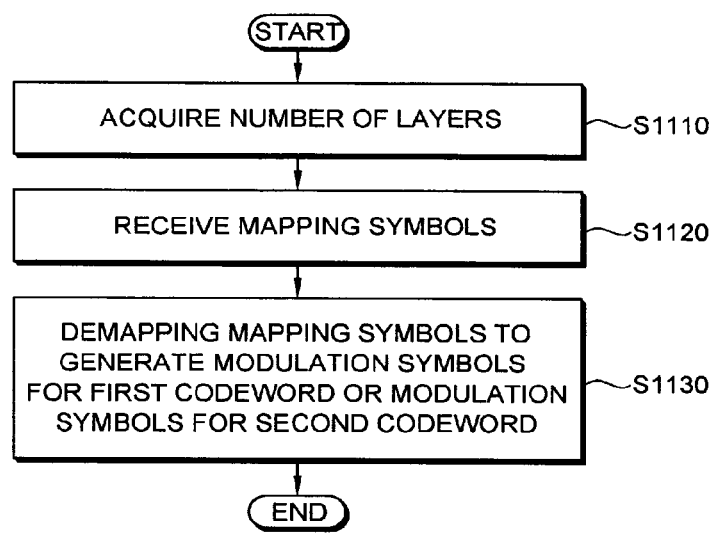
FIG. 39 is a flowchart showing a method of communication according to an embodiment of the present invention.

FIG. 39 is a flowchart showing a method of communication according to an embodiment of the present invention. This method may be carried in a UE at downlink transmission or in a BS at uplink transmission.

In step S1110, the number of layers is acquired. The number of layers may be larger than 3. The number of layers may be received through system information, a RRC message or resource assignment.

In step S1120, mapping symbols are received. The mapping symbols may be mapped to each layer according to one layer mapping schemes shown in FIGS. 3-34.

In step S1130, the mapping symbols are demapped to generate modulation symbols for a first codeword or modulation symbols for a second codeword. At least one of the first codeword and the second codeword may be mapped to at least 3 layers.

After demapping, the first codeword may be reproduced from the modulation symbols for the first codeword. The second codeword may be reproduced from the modulation symbols for the second codeword. The reproducing the codword from modulation symbols may be achieved by performing demodulation and decoding well known in the skilled art.

It can be understood that skilled in the art may reproduce a codeword from mapping symbols by reversely performing procedure shown in embodiments of FIG. 37 or apparatus of FIG. 2.

The layer mapping methods or other methods described in the aforementioned embodiments can be performed only at some ranks. For example, ranks 1, 2, 4, and 6 may be used in a system having 6 antenna ports, and ranks 1, 2, 4, 6, and 8 may be used in a system having 8 antenna ports. That is, instead of using all possible ranks, only some ranks may be used by considering a signal overhead, system complexity, and difference in performance of each rank. An available rank may be predetermined, or may be reported by the BS to the UE through upper layer signaling or L1/L2 signaling.

In case of upper layer signaling, an RRC parameter of "Codebook subset restriction indicator" with an extended bit-width (i.e., bit-map size) may be used to indicate the situation of restricted rank utilization. In case of predetermination, an RRC parameter of "codebookSubsetRestriction" may have the bit-width in which the states of this RRC parameter express the additional restriction of PMI usage for given available rank cases.

The layer mapping methods or other methods described in the aforementioned embodiments may be used by combining some ranks. For example, ranks 1 to 3 may be selected in the layer mapping method of the 1st embodiment and ranks 4 to 6 may be selected in the layer mapping method of the 2nd embodiment, so that a layer mapping method obtained by combining the two methods is used in a system having 6 antenna ports. For another example, among mapping methods of the respective embodiments, at least one mapping method corresponding to each rank may be selected to configure a new mapping method by combining the selected mapping methods. In addition, among extended mapping methods of the respective embodiments, at least one extended mapping method corresponding to each rank may be selected to configure a new extended mapping method by combining the selected extended mapping methods.

In the aforementioned embodiments, $M^{(q)}_{symb}$ may denote a total number of modulation symbols for a codeword q, or may denote the number of some modulation symbols constituting the codeword q. That is, if $M^{(q),tot}_{symb}$ denotes a total number of modulation symbols for the codeword q, the following relation may be satisfied: $1 < M^{(q)}_{symb} \leq M^{(q),tot}_{symb}$. If $M^{(q)}_{symb} = M^{(q),tot}_{symb}$, the basic layer mapping may be $M^{(q)}_{symb} < M^{(q),tot}_{symb}$ in case of extended mapping for the basic layer mapping. $M^{(q)}_{symb}$ in use may differ for each rank.

In the aforementioned embodiments, it is introduced that layers mapped to each codeword are sequentially mapped in an index order. However, indices of the layers may vary according to time or other situations. The indices of the layers may vary by a predetermined offset or in an arbitrary manner. Alternatively, the indices of the layers may vary by an offset predetermined according to a specific period or may vary in an arbitrary manner.

The layer mapping and/or extended mapping methods of each embodiment may be combined in a cell unit and/or a time unit. For example, the layer mapping of the 1st embodiment is used for all or some ranks at a first time slot, and the layer mapping of the 2nd embodiment may be used for all or some ranks at a second time slot.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A transmitter, the transmitter comprising:
   a radio frequency (RF) unit for transmitting and receiving a radio signal; and
   a processor coupled to the RF unit,
   wherein the processor is configured for:
   generating mapping symbols by mapping modulation symbols for a first codeword and modulation symbols for a second codeword to a plurality of layers; and
   transmitting the mapping symbols through a plurality of antennas,
   wherein when a number of the plurality of layers is larger than 4, at least one of the modulation symbols for the first codeword and the modulation symbols for the second codeword is mapped to at least 3 layers, and
   wherein when the number of the plurality of layers is 5, the modulation symbols for the first codeword are mapped to 2 layers and the modulation symbols for the second codeword are mapped to remaining 3 layers, and
   when the number of the plurality of layers is 6, the modulation symbols for the first codeword are mapped to 3 layers and the modulation symbols for the second codeword are mapped to remaining 3 layers, and
   when the number of the plurality of layers is 7, the modulation symbols for the first codeword are mapped to 3 layers and the modulation symbols for the second codeword are mapped to remaining 4 layers, and
   when the number of the plurality of layers is 8, the modulation symbols for the first codeword are mapped to 4 layers and the modulation symbols for the second codeword are mapped to remaining 4 layers.

2. The transmitter of claim 1, wherein a number of the plurality of antennas is larger than 3 and the number of the plurality of layers is smaller than or equal to the number of the plurality of antennas.

3. The transmitter of claim 1, the processor is further configured for:
   determining the number of the plurality of layers.

4. The transmitter of claim 1, wherein when the number of the plurality of layers is 5, 6, 7 or 8, the modulation symbols for the first codeword and the modulation symbols for the second codeword are mapped to layers according to below table:

| Number of the plurality of layers | Number of codewords | Codeword-to-layer mapping $i = 0, 1, \ldots, M^{layer}_{symb} - 1$, $M^{layer}_{symb}$: a number of modulation symbols for each layer of the plurality of layers | |
|---|---|---|---|
| 5 | 2 | $x^{(0)}(i) = d^{(0)}(2i)$ $x^{(1)}(i) = d^{(0)}(2i + 1)$ $x^{(2)}(i) = d^{(1)}(3i)$ $x^{(3)}(i) = d^{(1)}(3i + 1)$ $x^{(4)}(i) = d^{(1)}(3i + 2)$ | $M^{layer}_{symb} = M^{(0)}_{symb}/2 = M^{(1)}_{symb}/3$ |
| 6 | 2 | $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(3i)$ $x^{(4)}(i) = d^{(1)}(3i + 1)$ $x^{(5)}(i) = d^{(1)}(3i + 2)$ | $M^{layer}_{symb} = M^{(0)}_{symb}/3 = M^{(1)}_{symb}/3$ |
| 7 | 2 | $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(4i)$ $x^{(4)}(i) = d^{(1)}(4i + 1)$ $x^{(5)}(i) = d^{(1)}(4i + 2)$ $x^{(6)}(i) = d^{(1)}(4i + 3)$ | $M^{layer}_{symb} = M^{(0)}_{symb}/3 = M^{(1)}_{symb}/4$ |
| 8 | 2 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ $x^{(4)}(i) = d^{(1)}(4i)$ $x^{(5)}(i) = d^{(1)}(4i + 1)$ $x^{(6)}(i) = d^{(1)}(4i + 2)$ $x^{(7)}(i) = d^{(1)}(4i + 3)$ | $M^{layer}_{symb} = M^{(0)}_{symb}/4 = M^{(1)}_{symb}/4$ | in the above table, $d^{(0)}(i)$ is the modulation symbols for the first codeword, $d^{(1)}(i)$ is the modulation symbols for the second codeword, $x^{(n)}(i)$ is mapping symbols mapped to layer n, $M^{(0)}_{symb}$ is a number of modulation symbols for the first codeword and $M^{(1)}_{symb}$ is a number of modulation symbols for the second codeword.

5. A receiver, the receiver comprising:
a radio frequency (RF) unit for transmitting and receiving a radio signal; and
a processor coupled to the RF unit,
wherein the processor is configured for:
receiving mapping symbols which are mapped to a plurality of layers; and
demapping the mapping symbols to generate modulation symbols for a first codeword and modulation symbols for a second codeword,
wherein when a number of the plurality of layers is larger than 4, at least one of the modulation symbols for the first codeword and the modulation symbols for the second codeword is mapped to at least 3 layers, and
wherein when the number of the plurality of layers is 5, the modulation symbols for the first codeword are mapped to 2 layers and the modulation symbols for the second codeword are mapped to remaining 3 layers, and when the number of the plurality of layers is 6, the modulation symbols for the first codeword are mapped to 3 layers and the modulation symbols for the second codeword are mapped to remaining 3 layers, and when the number of the plurality of layers is 7, the modulation symbols for the first codeword are mapped to 3 layers and the modulation symbols for the second codeword are mapped to remaining 4 layers, and when the number of the plurality of layers is 8, the modulation symbols for the first codeword are mapped to 4 layers and the modulation symbols for the second codeword are mapped to remaining 4 layers.

\* \* \* \* \*